US010846203B2

(12) United States Patent
Pugh et al.

(10) Patent No.: US 10,846,203 B2
(45) Date of Patent: Nov. 24, 2020

(54) RESPONDING TO REQUESTS BY TRACKING FILE EDITS

(71) Applicant: Microsoft Technology Licensing, LLC, Redmond, WA (US)

(72) Inventors: David Ellis Pugh, Bellevue, WA (US); Srivatsn Narayanan, Bothell, WA (US); Kesavan Shanmugam, Redmond, WA (US); Guillaume Jenkins, Redmond, WA (US); Jason Ronald William Ramsay, Seattle, WA (US); Daniel Lebu, Redmond, WA (US); Alexandru Dima, Zurich (CH); Erich Gamma, Gutenswil (CH)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 279 days.

(21) Appl. No.: 15/948,714

(22) Filed: Apr. 9, 2018

(65) Prior Publication Data

US 2019/0147048 A1  May 16, 2019

Related U.S. Application Data

(60) Provisional application No. 62/585,988, filed on Nov. 14, 2017.

(51) Int. Cl.
G06F 16/00 (2019.01)
G06F 11/36 (2006.01)
(Continued)

(52) U.S. Cl.
CPC ............ *G06F 11/3664* (2013.01); *G06F 8/30* (2013.01); *G06F 8/33* (2013.01); *G06F 8/41* (2013.01);
(Continued)

(58) Field of Classification Search
CPC ........ G06F 40/197; G06F 40/166; G06F 8/30; G06F 16/1873; G06F 8/33; G06F 21/6218; G06F 8/71; G06F 16/176
(Continued)

(56) References Cited

U.S. PATENT DOCUMENTS 5,361,360 A  11/1994 Ishigami et al.
5,535,375 A   7/1996 Eshel et al.
(Continued)

OTHER PUBLICATIONS

"Final Office Action Issued in U.S. Appl. No. 15/879,256", dated Feb. 4, 2020, 18 Pages. (MS# 403565-US-NP).
(Continued)

*Primary Examiner* — Thanh-Ha Dang
(74) *Attorney, Agent, or Firm* — Workman Nydegger

(57) ABSTRACT

Tracking edits executed against a file to ensure that the edits are monitored consistently so that language service requests are properly handled. Initially, a collaboration session is established. This collaboration session includes an owner and a participant computer system. Then, the owner computing system receives messages that are directed toward a file stored by the owner computer system. These messages include edits that are to be performed against the file and language service request(s). A file version is then assigned to a subset of these edits. As the subset of edits are executed against the file, the file's state changes. The file versions are published to both the participant computer system and to a language service running on the owner computer system. The language service uses the published file versions to track the edits that are being executed against the file and to respond to the language service request(s).

20 Claims, 19 Drawing Sheets

(51) Int. Cl.

| | | |
|---|---|---|
| *H04L 29/06* | (2006.01) | |
| *G06F 16/176* | (2019.01) | |
| *G06F 9/52* | (2006.01) | |
| *G06F 9/54* | (2006.01) | |
| *H04L 12/18* | (2006.01) | |
| *G06Q 10/10* | (2012.01) | |
| *G06F 40/166* | (2020.01) | |
| *G06F 40/197* | (2020.01) | |
| *H04L 29/08* | (2006.01) | |
| *G06F 8/71* | (2018.01) | |
| *G06F 21/62* | (2013.01) | |
| *G06F 8/33* | (2018.01) | |
| *G06F 8/41* | (2018.01) | |
| *G06F 16/18* | (2019.01) | |
| *G06F 16/13* | (2019.01) | |
| *G06F 16/17* | (2019.01) | |
| *G06F 8/30* | (2018.01) | |
| *G06F 3/0482* | (2013.01) | |
| *G06F 3/0484* | (2013.01) | |

(52) U.S. Cl.
CPC ............... *G06F 8/71* (2013.01); *G06F 9/52* (2013.01); *G06F 9/542* (2013.01); *G06F 9/543* (2013.01); *G06F 11/362* (2013.01); *G06F 11/3632* (2013.01); *G06F 11/3636* (2013.01); *G06F 11/3668* (2013.01); *G06F 16/13* (2019.01); *G06F 16/176* (2019.01); *G06F 16/1734* (2019.01); *G06F 16/1873* (2019.01); *G06F 21/6218* (2013.01); *G06F 40/166* (2020.01); *G06F 40/197* (2020.01); *G06Q 10/101* (2013.01); *H04L 12/1813* (2013.01); *H04L 12/1822* (2013.01); *H04L 63/08* (2013.01); *H04L 65/1069* (2013.01); *H04L 65/403* (2013.01); *H04L 67/02* (2013.01); *H04L 67/14* (2013.01); *G06F 3/0482* (2013.01); *G06F 3/0484* (2013.01); *H04L 67/141* (2013.01)

(58) Field of Classification Search
USPC ........................................................ 707/695
See application file for complete search history.

(56) References Cited

U.S. PATENT DOCUMENTS

| | | | |
|---|---|---|---|
| 6,405,364 B1 | 6/2002 | Bowman-Amuah | |
| 7,249,314 B2* | 7/2007 | Walker | G06F 21/6227 715/205 |
| 7,359,990 B2 | 4/2008 | Munir et al. | |
| 7,734,685 B2 | 6/2010 | Cheng et al. | |
| 7,774,703 B2* | 8/2010 | Junuzovic | G06Q 10/10 715/246 |
| 7,805,702 B2 | 9/2010 | Jacovi et al. | |
| 7,904,418 B2* | 3/2011 | Agrawal | G06F 40/166 707/610 |
| 8,032,470 B1 | 10/2011 | Heidenreich et al. | |
| 8,196,029 B1* | 6/2012 | Rucker | G06F 40/197 715/200 |
| 8,230,348 B2 | 7/2012 | Peters et al. | |
| 8,234,620 B1 | 7/2012 | Bychkov et al. | |
| 8,321,483 B2 | 11/2012 | Serlet et al. | |
| 8,434,002 B1* | 4/2013 | Shah | G06F 40/106 715/255 |
| 8,789,014 B2 | 7/2014 | Robison et al. | |
| 8,819,617 B1 | 8/2014 | Koenig et al. | |
| 9,026,652 B1 | 5/2015 | Piehler et al. | |
| 9,244,817 B2 | 1/2016 | Cai et al. | |
| 9,268,670 B1 | 2/2016 | Lachwani et al. | |
| 9,465,784 B1* | 10/2016 | Hagopian | G06F 40/131 |
| 9,483,259 B1 | 11/2016 | Lee et al. | |
| 9,729,615 B2 | 8/2017 | Nair | |
| 10,049,028 B2 | 8/2018 | Tucker et al. | |
| 10,055,205 B2 | 8/2018 | Di Balsamo et al. | |
| 10,261,885 B2 | 4/2019 | Tucker et al. | |
| 2002/0056003 A1* | 5/2002 | Goswami | H04L 12/1822 709/227 |
| 2002/0129106 A1 | 9/2002 | Gutfreund | |
| 2004/0003119 A1 | 1/2004 | Munir et al. | |
| 2004/0234315 A1 | 11/2004 | Colwell et al. | |
| 2004/0261064 A1 | 12/2004 | Goldstein et al. | |
| 2005/0172168 A1 | 8/2005 | Kilian | |
| 2006/0195894 A1 | 8/2006 | Nita et al. | |
| 2007/0220479 A1 | 9/2007 | Hughes | |
| 2008/0005235 A1 | 1/2008 | Hegde et al. | |
| 2008/0028323 A1 | 1/2008 | Rosen et al. | |
| 2008/0059941 A1 | 3/2008 | Payne et al. | |
| 2008/0120564 A1 | 5/2008 | Balasubramanian et al. | |
| 2009/0021855 A1 | 1/2009 | Fasen | |
| 2009/0125518 A1* | 5/2009 | Bailor | H04L 65/4015 |
| 2009/0133033 A1 | 5/2009 | Lindo et al. | |
| 2009/0245843 A1 | 10/2009 | Sato | |
| 2009/0249224 A1* | 10/2009 | Davis | G06F 40/169 715/753 |
| 2009/0254843 A1 | 10/2009 | Van wie et al. | |
| 2009/0271708 A1 | 10/2009 | Peters et al. | |
| 2010/0057865 A1 | 3/2010 | Chan et al. | |
| 2010/0174783 A1 | 7/2010 | Zarom | |
| 2010/0191785 A1 | 7/2010 | Serlet et al. | |
| 2010/0257457 A1* | 10/2010 | De Goes | H04L 65/1093 715/751 |
| 2011/0296300 A1* | 12/2011 | Parker | G06Q 10/00 715/256 |
| 2012/0023418 A1 | 1/2012 | Frields et al. | |
| 2012/0047295 A1 | 2/2012 | Wong | |
| 2012/0084758 A1 | 4/2012 | Bates | |
| 2012/0102459 A1 | 4/2012 | Bates | |
| 2012/0102460 A1 | 4/2012 | Bates | |
| 2012/0102463 A1 | 4/2012 | Bates | |
| 2012/0102464 A1 | 4/2012 | Bates | |
| 2012/0102465 A1 | 4/2012 | Bates | |
| 2012/0102466 A1 | 4/2012 | Bates | |
| 2012/0102467 A1 | 4/2012 | Bates | |
| 2012/0117457 A1* | 5/2012 | Yuniardi | G06F 40/197 715/229 |
| 2012/0117541 A1 | 5/2012 | Bates | |
| 2012/0117542 A1 | 5/2012 | Bates | |
| 2012/0117543 A1 | 5/2012 | Bates | |
| 2012/0137268 A1 | 5/2012 | Dattke | |
| 2012/0151446 A1 | 6/2012 | Sathya et al. | |
| 2012/0246610 A1 | 9/2012 | Asadullah et al. | |
| 2012/0254773 A1 | 10/2012 | Viswanathan | |
| 2012/0272216 A1 | 10/2012 | Bates | |
| 2012/0272217 A1 | 10/2012 | Bates | |
| 2012/0272218 A1 | 10/2012 | Bates | |
| 2012/0272219 A1 | 10/2012 | Bates | |
| 2012/0278388 A1 | 11/2012 | Kleinbart et al. | |
| 2012/0278790 A1 | 11/2012 | Bates | |
| 2012/0297363 A1 | 11/2012 | Perisic et al. | |
| 2012/0317552 A1 | 12/2012 | Bates | |
| 2012/0331351 A1 | 12/2012 | Davis et al. | |
| 2012/0331404 A1* | 12/2012 | Buford | G06Q 10/10 715/757 |
| 2013/0007716 A1 | 1/2013 | Bates | |
| 2013/0185252 A1* | 7/2013 | Palmucci | G06F 40/197 707/608 |
| 2013/0205203 A1* | 8/2013 | MacDougall | G06F 40/169 715/256 |
| 2013/0247004 A1 | 9/2013 | Deluca et al. | |
| 2013/0262373 A1* | 10/2013 | Rampson | G06F 40/197 707/608 |
| 2013/0275312 A1 | 10/2013 | Claman et al. | |
| 2013/0275948 A1 | 10/2013 | Bates et al. | |
| 2014/0047356 A1 | 2/2014 | Baumberghen et al. | |
| 2014/0173565 A1 | 6/2014 | Scholl et al. | |
| 2014/0289645 A1* | 9/2014 | Megiddo | G06F 3/048 715/753 |
| 2015/0033078 A1 | 1/2015 | Wintergerst et al. | |
| 2015/0040101 A1 | 2/2015 | Rummler et al. | |

(56) References Cited

U.S. PATENT DOCUMENTS

| | | |
|---|---|---|
| 2015/0106790 A1 | 4/2015 | Bigwood et al. |
| 2015/0135165 A1 | 5/2015 | Simernitski et al. |
| 2015/0142949 A1 | 5/2015 | Nair |
| 2015/0149404 A1 | 5/2015 | Lock et al. |
| 2015/0193406 A1 | 7/2015 | Lemonik et al. |
| 2016/0004529 A1 | 1/2016 | Xia et al. |
| 2016/0092211 A1 | 3/2016 | Atanasiu et al. |
| 2016/0103662 A1 | 4/2016 | Di balsamo et al. |
| 2016/0112262 A1 | 4/2016 | Johnson et al. |
| 2016/0224337 A1 | 8/2016 | Xia et al. |
| 2016/0321291 A1* | 11/2016 | Malhotra ............... G06F 16/188 |
| 2017/0003835 A1 | 1/2017 | Shaffer et al. |
| 2017/0017779 A1* | 1/2017 | Huang .................. G06F 40/106 |
| 2017/0083490 A1 | 3/2017 | Kikin-gil et al. |
| 2017/0097822 A1 | 4/2017 | Deluca et al. |
| 2017/0168809 A1 | 6/2017 | Zander |
| 2017/0262294 A1 | 9/2017 | Yakan |
| 2017/0269926 A1 | 9/2017 | Xu |
| 2017/0353458 A1 | 12/2017 | Lipke et al. |
| 2017/0357486 A1 | 12/2017 | Deluca et al. |
| 2018/0004628 A1 | 1/2018 | Strong et al. |
| 2018/0121327 A1 | 5/2018 | Grebenschikov |
| 2018/0124155 A1* | 5/2018 | Ryzhkov ............. H04L 67/2804 |
| 2018/0129584 A1 | 5/2018 | Somasundaram et al. |
| 2018/0157676 A1* | 6/2018 | Milvaney ............... G06F 16/176 |
| 2018/0181552 A1* | 6/2018 | Konnola ............... G06F 40/197 |
| 2019/0079909 A1* | 3/2019 | Purandare ............ G06Q 10/101 |
| 2019/0129973 A1* | 5/2019 | Truong ................. G06F 16/176 |
| 2019/0146758 A1 | 5/2019 | Lantz et al. |
| 2019/0146783 A1 | 5/2019 | Ginchereau et al. |
| 2019/0146898 A1 | 5/2019 | Silva et al. |
| 2019/0146899 A1 | 5/2019 | Lantz et al. |
| 2019/0149346 A1 | 5/2019 | Shanmugam et al. |
| 2019/0278839 A1* | 9/2019 | Codrington ......... G06F 16/2282 |

OTHER PUBLICATIONS

"Non Final Office Action Issued in U.S. Appl. No. 15/879,289", dated Jan. 10, 2020, 12 Pages. (MS# 403586-US-NP).

"Final Office Action Issued in U.S. Appl. No. 15/879,296", dated Feb. 21, 2020, 22 Pages. (MS# 403420-US-NP).

The Vs Code Team: "Common Language Server Protocol", Retrieved From: https://code.visualstudio.com/blogs/2016/06/27/common-language-protocol, Jun. 27, 2016, 4 Pages.

Barbero, Mikael, "The Language Server Protocol: Why the Hype?", Retrieved From: https://www.slideshare.net/mikaelbarbero/language-server-protocol-why-the-hype, Jul. 29, 2017, 72 Pages.

Estler, et al., "Collaborative Debugging", In Proceedings of the IEEE 8th International Conference on Global Software Engineering, Aug. 26, 2013, pp. 110-119.

Goldman, et al., "Real-Time Collaborative Coding in a Web IDE", In Proceedings of the 24th Annual ACM Symposium on User Interface Software and Technology, Oct. 16-19, 2011, pp. 155-164.

Keidel, Sven, "A Disintegrated Development Environment", Retrieved From: http://www.informatik.uni-marburg.de/~seba/teaching/thesis-keidel.pdf, Apr. 9, 2015, 47 Pages.

"International Search Report and Written Opinion Issued in PCT Application No. PCT/US18/059714", dated Feb. 21, 2019, 11 Pages. (MS# 403420-WO-PCT).

"International Search Report and Written Opinion Issued in PCT Application No. PCT/US18/059715", dated Feb. 21, 2019, 13 Pages. (MS# 403565-WO-PCT).

"International Search Report and Written Opinion Issued in PCT Application No. PCT/US18/059716", dated Feb. 21, 2019, 12 Pages. (MS# 403566-WO-PCT).

"International Search Report and Written Opinion Issued in PCT Application No. PCT/US18/059717", dated Feb. 19, 2019, 13 Pages. (MS# 403586-WO-PCT).

"International Search Report and Written Opinion Issued in PCT Application No. PCT/US18/059718", dated Feb. 18, 2019, 12 Pages. (MS# 403587-WO-PCT).

"International Search Report and Written Opinion Issued in PCT Application No. PCT/US18/059719", dated Feb. 19, 2019, 15 Pages. (MS# 403589-WO-PCT).

"Final Office Action Issued in U.S. Appl. No. 15/879,261", dated Jun. 20, 2019, 22 Pages. (MS# 403566-US-NP).

"Non Final Office Action Issued in U.S. Appl. No. 15/879,261", dated Oct. 28, 2019, 24 Pages. (MS# 403587-US-NP).

"Notice of Allowance Issued in U.S. Appl. No. 15/879,266", dated Nov. 21, 2019, 9 Pages. (MS# 403587-US-NP).

Nezha, et al., "Extending Cloud Studio with Collaborative Remote Debugger", In Master of Science Thesis, Dec. 20, 2012, 139 Pages.

Wang, et al., "A Dual-Mode Exerciser for a Collaborative Computing Environment", In IEEE 11th Asia-Pacific Software Engineering Conference, Nov. 30, 2004, 9 Pages.

Zhang, et al., "CDebugger: A Scalable Parallel Debugger with Dynamic Communication Topology Configuration", In International Conference on Cloud and Service Computing, Dec. 12, 2011, pp. 228-234.

"Non Final Office Action Issued in U.S. Appl. No. 15/879,256", dated Aug. 14, 2019, 20 Pages. (MS# 403565-US-NP).

"Non Final Office Action Issued in U.S. Appl. No. 15/879,266", dated Aug. 8, 2019, 20 Pages. (MS# 403587-US-NP).

"Non Final Office Action Issued in U.S. Appl. No. 15/879,296", dated Aug. 22, 2019, 21 Pages. (MS# 403420-US-NP).

"JSON-RPC 2.0 Specification", Retreived From: http://www.jsonrpc.org/specification, Mar. 26, 2010, 7 Pages.

"Software build", Retrieved From: https://en.wikipedia.org/wiki/Software_build, Retrieved Date: Oct. 29, 2018, 2 Pages.

"Non Final Office Action Issued in U.S. Appl. No. 15/879,256", dated Sep. 20, 2018, 17 Pages. (MS# 403565-US-NP).

"Non Final Office Action Issued in U.S. Appl. No. 15/879,261", dated Oct. 5, 2018, 26 Pages. (MS# 403566-US-NP).

"Non Final Office Action Issued in U.S. Appl. No. 15/879,266", dated Nov. 2, 2018, 21 Pages. (MS# 403587-US-NP).

"Non Final Office Action Issued in U.S. Appl. No. 15/879,296", dated Nov. 2, 2018, 20 Pages. (MS# 403420-US-NP).

"Final Office Action Issued in U.S. Appl. No. 15/879,256", dated May 3, 2019, 17 Pages. (MS# 403565-US-NP).

"Final Office Action Issued in U.S. Appl. No. 15/879,266", dated May 2, 2019, 21 Pages. (MS# 403587-US-NP).

"Final Office Action Issued in U.S. Appl. No. 15/879,296", dated May 16, 2019, 20 Pages. (MS# 403420-US-NP).

Gousset, Mickey, "Visual Studio Collaboration, Anywhere", Retrieved From: https://visualstudiomagazine.com/articles/2013/06/03/visual-studio-collaboration-anywhere.aspx, Jun. 3, 2013, 5 Pages.

Heydarian, Habib, "One bug, two developers: Collaborative debugging is now a Reality in Visual Studio 2010", Retrieved From: https://blogs.msdn.microsoft.com/habibh/2009/12/01/one-bug-two-developers-collaborative-debugging-is-now-a-reality-in-visual-studio-20101, Dec. 1, 2009, 16 Pages.

"Final Office Action Issued in U.S. Appl. No. 15/879,261", dated Feb. 25, 2020, 25 Pages. (MS# 403566-US-NP).

"Non Final Office Action Issued in U.S. Appl. No. 15/879,256", dated Jun. 23, 2020, 18 Pages.

"Non Final Office Action Issued in U.S. Appl No. 15/879,261", dated Jun. 24, 2020, 24 Pages.

\* cited by examiner

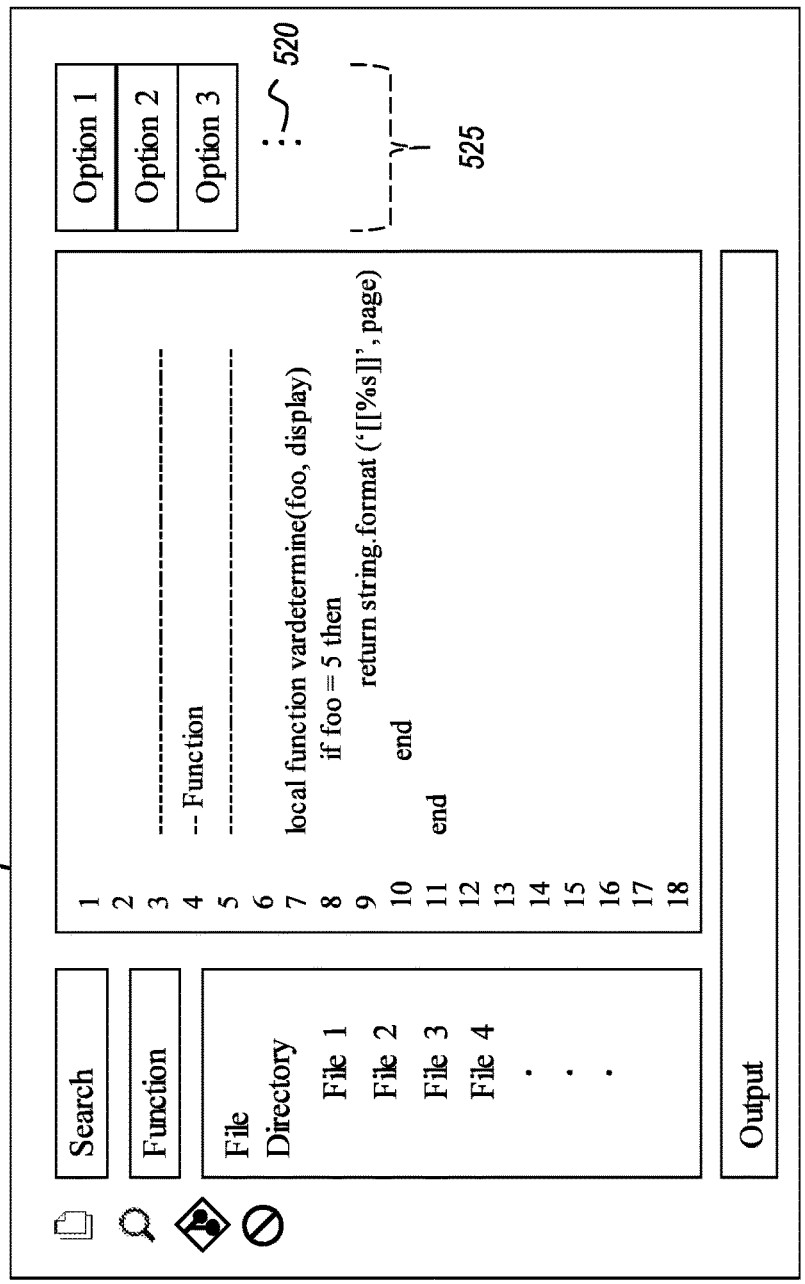
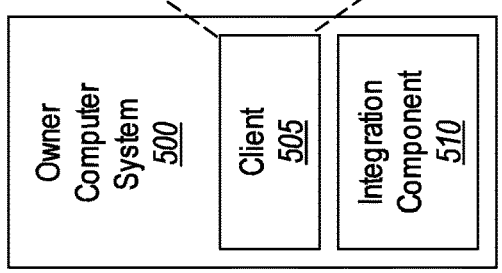
FIG. 5

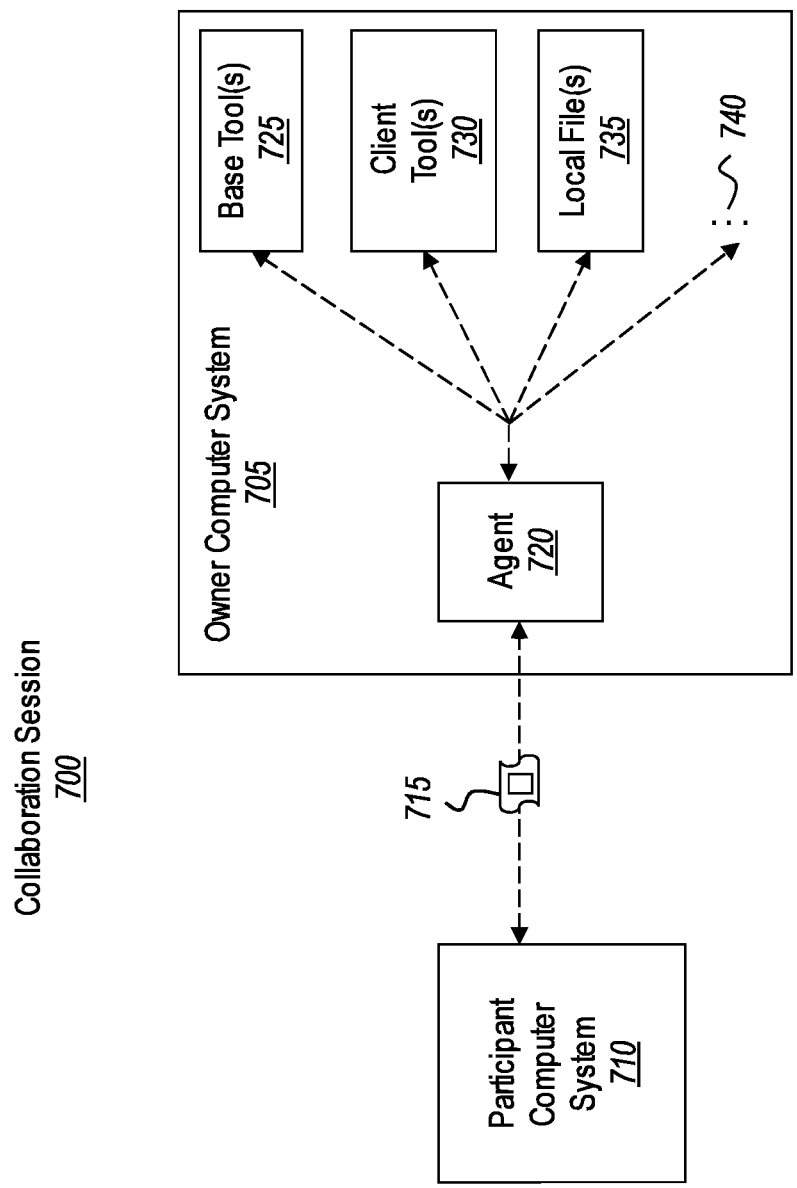

Participant 1's Understanding

Originally At Version 0

Source Code
1000A

```
1
2   -------------------------
3   -- Function
4   -------------------------
5
6   local function vardetermine(foo, display)
7       if foo = 5 then
8           return string.format('[[%s]]', page)    FINITE
9
10
11
12
13
14
15
16      end
17  end
18
```

Participant 2's Understanding

Originally At Version 0

Source Code
1000B

```
1
2    -------------------
3    -- Function
4    -------------------
5
6    local function vardetermine(foo, display)
7        if foo = 5 then
8            return string.format ('[[%s]]', page)
9
10
11
12
13              ┌ ─ ─ ─ ┐
                │  DEF  │
                └ ─ ─ ─ ┘
14
15
16       end
17   end
18
```

Actual Source Code

Some Later Version

Source Code 1000C

```
1
2  -----------------------
3  -- Function
4  -----------------------
5
6  local function vardetermine(foo, display)
7     if foo = 5 then
8        return string.format ('[[%s]]', page)
9
10    FINITE
11
12
13    DEF        ┌──────────────┐
14               │  DIRECT      │
15    end        │  DIFFERENCE  │
16               │  DO          │
17    end        └──────────────┘
18
```

RESPONDING TO REQUESTS BY TRACKING FILE EDITS

CROSS-REFERENCE TO RELATED APPLICATIONS

This application claims priority to U.S. Provisional Application Ser. No. 62/585,988, filed on Nov. 14, 2017 and entitled "MULTI-FILE REAL-TIME COLLABORATION ENVIRONMENT," the entirety of which is incorporated herein by reference.

BACKGROUND

Computers and computing systems have impacted nearly every aspect of modern-day living. For instance, computers are generally involved in work, recreation, healthcare, transportation, and so forth.

A computer operates by executing a set of executable instructions (i.e. code). These instructions were created in a development environment by a developer in order to create an application. In many instances, the developer will generate many different versions of the code in an effort to improve the computer's operations and to remove any bugs that are present in the code. Once the instructions are compiled, interpreted, and/or built, an underlying computer system executes the instructions to provide the application's functionalities.

Different tools have been created to assist a developer in writing, editing, testing, and debugging an application's executable instructions. Some of these tools include program code text editors, source code editors, debuggers, and integrated development environments (IDEs), just to name a few. The process of generating and debugging code can be improved through the participation of additional developers. For example, by working together in a team, team members are able to jointly collaborate to review and improve a project.

The subject matter claimed herein is not limited to embodiments that solve any disadvantages or that operate only in environments such as those described above. Rather, this background is provided to illustrate only one example technology area where some embodiments described herein may be practiced.

BRIEF SUMMARY

At least some of the embodiments described herein relate to tracking edits made to a file to ensure that a language service is able to properly respond to language service requests (such as a completion request) even when those requests are directed to a file that is changing and even when multiple, simultaneous edits are occurring. To that end, a collaboration session is initially established. Here, this collaboration session may include an owner computer system and any number of participant computer systems. This collaboration session is beneficial because it provides a controlled environment that enables the collaborators (i.e. the owner computer system and the participant computer system(s)) to jointly work on a file that is stored on the owner computer system. For instance, within this collaboration session, a number of messages that are directed toward that file may be received. Optionally, these messages may include multiple edits that are to be executed against the file and/or one or more language service requests that are also to be executed against the file.

After these edits are received, then a file version is assigned to at least a subset of the multiple edits. Here, this process is beneficial because it defines how, or rather in what order, the edits in the subset are to be executed against the file. As such, when the edits in the subset are actually executed against the file (based on the defined ordering), then a state of the file changes in a corresponding manner. Because one or more entities (e.g., perhaps the participant computer system and/or a language service running on the owner computer system) potentially depend on that file, it is beneficial to track those edits to monitor how that file changes in response to the edits.

Therefore, in addition to the processes outlined above, the file versions are also published to both the participant computer system and to a language service that is running on the owner computer system. In this manner, the language service participates in tracking the edits that are made to a file. In fact, not only is the language service able to use the published file versions to track the edits, but the language service is also able to respond to the one or more language service requests using its tracking. As a result, the language service is able to properly respond to at least some of the language service requests even when those requests are directed to a file that is changing.

In this manner, not only can a participant computer system participate in monitoring the edits made to a file, but a language service can also participate in monitoring the edits made to the file. Furthermore, by practicing the principles disclosed herein, significant advantages are realized because consistency is maintained between the changing file as well as the potentially many entities that are tracking the multiple, simultaneous edits (e.g., the language service, the participant computer system(s), etc.). As such, the language service is able to determine how best to handle a language service request because the language service understands the file's state. Additionally, because the language service tracks the edits in a manner that is eventually consistent with any participant computer system's tracking of the edits, the language service is able to provide adequate responses to those language service requests.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5 shows how an integration component is able to configure a client application's user interface so that the user interface includes collaboration options.

FIG. 7 demonstrates how an owner computer system is able to process requests submitted by a participant computer system.

FIGS. 10A, 10B, and 10C demonstrate an undesired example scenario in which edits are improperly executed against a file.

DETAILED DESCRIPTION

Figure 1:
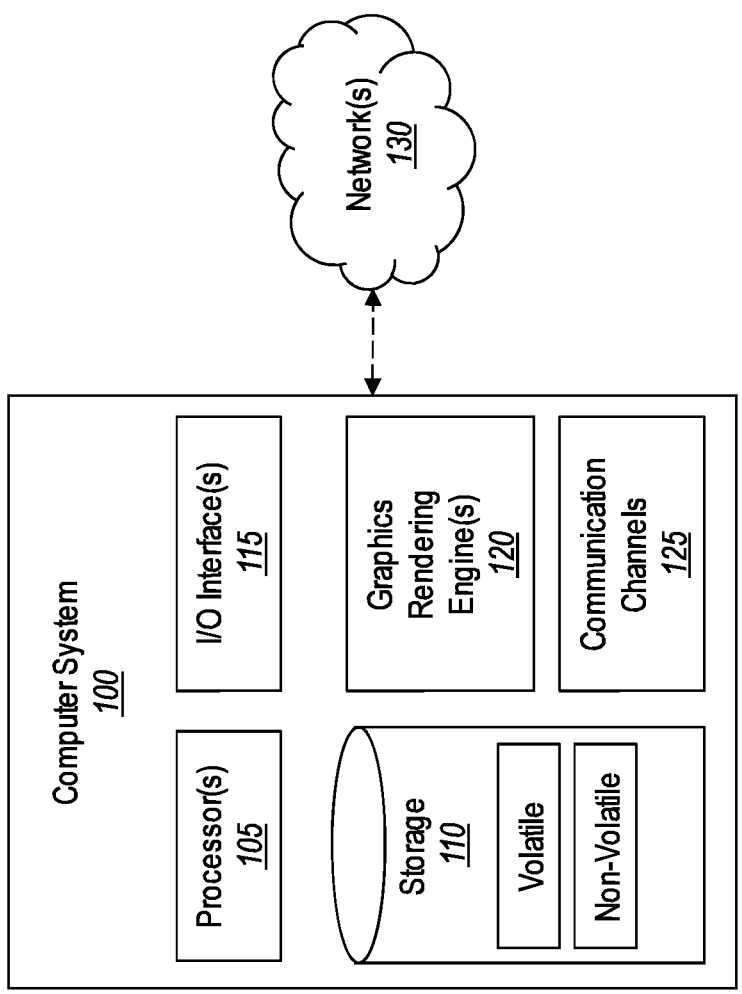
FIG. 1 illustrates an overall view of a computer system, including an illustration of some of its features and functionalities.

At least some of the embodiments described herein relate to tracking edits made to a file to ensure that a language service is able to properly respond to language service requests (such as a completion request) even when those requests are directed to a file that is changing and even when multiple, simultaneous edits are occurring. To that end, a collaboration session is initially established. Here, this collaboration session may include an owner computer system and any number of participant computer systems. This collaboration session is beneficial because it provides a controlled environment that enables the collaborators (i.e. the owner computer system and the participant computer system(s)) to jointly work on a file that is stored on the owner computer system. For instance, within this collaboration session, a number of messages that are directed toward that file may be received. Optionally, these messages may include multiple edits that are to be executed against the file and/or one or more language service requests that are also to be executed against the file.

After these edits are received, then a file version is assigned to at least a subset of the multiple edits. Here, this process is beneficial because it defines how, or rather in what order, the edits in the subset are to be executed against the file. As such, when the edits in the subset are actually executed against the file (based on the defined ordering), then a state of the file changes in a corresponding manner. Because one or more entities (e.g., perhaps the participant computer system and/or a language service running on the owner computer system) potentially depend on that file, it is beneficial to track those edits to monitor how that file changes in response to the edits.

Therefore, in addition to the processes outlined above, the file versions are also published to both the participant computer system and to a language service that is running on the owner computer system. In this manner, the language service participates in tracking the edits that are made to a file. In fact, not only is the language service able to use the published file versions to track the edits, but the language service is also able to respond to the one or more language service requests using its tracking. As a result, the language service is able to properly respond to at least some of the language service requests even when those requests are directed to a file that is changing.

In this manner, not only can a participant computer system participate in monitoring the edits made to a file, but a language service can also participate in monitoring the edits made to the file. Furthermore, by practicing the principles disclosed herein, significant advantages are realized because consistency is maintained between the changing file as well as the potentially many entities that are tracking the multiple, simultaneous edits (e.g., the language service, the participant computer system(s), etc.). As such, the language service is able to determine how best to handle a language service request because the language service understands the file's state. Additionally, because the language service tracks the edits in a manner that is eventually consistent with any participant computer system's tracking of the edits, the language service is able to provide adequate responses to those language service requests.

An advantage of the disclosed embodiments is that they allow an "owner collaborator" (or simply "owner") to remain in control of his/her multi-file workspace even when outside collaborators (also called hereinafter "participant collaborators" or simply "participant(s)") are joined with the owner in the "collaborative session." Here, the term "owner" can refer to either a "human owner" or an "owner computer system." Similarly, the term "participant" can refer to either a "human participant" or a "participant computer system." In contrast, an "owner computer system" and a "participant computer system" refer only to a computer system and do not include a human operator. Additionally, "collaborator" refers to any entity (e.g., an owner or a participant) that has joined a collaboration session while "collaborators" refers to some or all of the entities in the collaboration session (e.g., the owner and the participants).

As also used herein, a "multi-file workspace" is an assembly of multiple files that operate collectively by interacting with each other. As an example, a code development project may include multiple files of source code that, when executed, operate together to perform complex functions. Thus, a code development project may be considered a multi-file workspace. Other examples of a multi-file workspace include, but are not limited to, text files and/or word processing files (e.g., where the files are linked via a table of contents or some other linking unit), or any other content in which multiple sources of data are joined together. Yet another non-limiting example of a multi-file workspace is a wiki-based workspace that is configured to receive edits and/or markdowns from multiple entities. Accordingly, from this disclosure, it will be appreciated that the embodiments are able to operate with regard to any kind of multi-file workspace. For the sake of brevity, and by way of example only, the remaining portion of this disclosure will focus on a multi-file workspace that includes multiple files of source code.

Here, it is also worthwhile to note that a "collaboration session," as used herein, is an occurrence in which an owner computer system is joined with one or more participant computer systems in order to jointly collaborate on a multi-file workspace. During this collaboration session, the participant computer systems are provided access to a multi-file workspace that is stored locally on the owner computer system. In this manner, the participants need not download the multi-file workspace. Instead, the participant computer systems act as headless units because editing and other operations may be performed on the owner computer system as opposed to occurring on each of the participant computer systems.

To build on the understanding presented above, collaboration sessions may be initiated for a broad variety of reasons. For example, in some instances, a collaboration session may be established so that the participants can assist the owner in performing a certain function. For instance, if the collaboration involves debugging, the owner might be the primary person tasked with generating the code, whereas the participants may be other developers who are helping the owner debug that code. In a learning environment, the owner may be a student, and the participant may be a teacher. In an alternative learning environment, a professor may be the owner and his/her students may be the participants. In such a scenario, the professor is able to guide his/her students in demonstrating how the workspace operates. In this context, the owner is able to retain administrative control over his/her multi-file workspace.

Yet another example scenario includes a coding interview process in which the interviewer sets up a workspace environment (e.g., a coding environment). Here, the interviewer is the owner and the interviewee is the participant. In another example scenario, an owner need not be a human on one end of the system. Instead, an owner computer system may be a build server that has no human owner. In this scenario, as will be discussed in more detail later, a human participant, who is using a participant computer system, is able to join a remote codebase (i.e. an "owner" build instance) for the purpose of collaborating in a debugging scenario. Of note, in situations where the owner is a build instance, the disclosed embodiments enable one (or perhaps more) of the participants to assume control of the multi-file workspace. Relatedly, a participant is also able to assume ownership for specific changes to the multi-file workspace.

Having just described some of the situations in which the embodiments may be practiced, the disclosure will now introduce some of the technical benefits that are provided herein. For example, the disclosed embodiments may be implemented to overcome many of the technical difficulties and computational expenses associated with jointly controlling and collaborating on a multi-file workspace. To illustrate, conventional methods for debugging an application often involve each collaborator installing a workspace's global environment/context (for reference, the term "context," as used herein, refers to the state of a workspace) and then applying the same data (or steps) in order to reproduce the exact issues that led to finding a bug. Such a process consumes a significant amount of time, computing resources, and manpower.

In contrast to the scenario presented above, the disclosed embodiments provide significant advantages because they enable multiple computers to connect to a single computer, which is running a workspace's environmental logic (e.g., services) and which is maintaining a global context of the workspace, to thereby allow the collaborators to jointly collaborate on the multi-file workspace (as opposed to having multiple different workspaces operating on multiple different computers). These operations result in a significant increase in the overall efficiency of the collaborating computer systems.

Another advantage of the disclosed embodiments is that because only a single workspace is being operated on, the collaborators' operations cause a consistent body of source code to be developed. For example, when multiple collaborators (e.g., code developers) are joined together in a collaborative session, each collaborator is made aware (in real-time) of at least some, and potentially all, of the actions of the other collaborators because each collaborator is working on the same workspace. In other words, each collaborator's individual understanding of the source code becomes consistent with the other collaborators' understanding of the source code.

Having just described various advantages and high-level attributes of some of the disclosed embodiments, the disclosure will now focus on FIG. 1 which presents an introductory discussion of an example computer system. Following that discussion, the disclosure will focus on FIGS. 2 through 9. In particular, these figures illustrate various architectures and supporting illustrations for providing a collaboration session according to the disclosed principles. Following that discussion, the disclosure will focus on FIGS. 10A through 13B which illustrate various scenarios, methods, architectures, and supporting illustrations for tracking edits executed against a file to ensure that any edits made on the file are monitored consistently across any interested entities, including a language service entity. Finally, the disclosure will turn to FIGS. 14 and 15 which detail various different scenarios and methods regarding how the language service may respond to a language service request.

Example Computer System

As illustrated in FIG. 1, in its most basic configuration, a computer system 100 includes various different components. For example, FIG. 1 shows that computer system 100 includes at least one hardware processing unit 105 (aka "processor"), storage 110, input/output (I/O) interfaces 115, graphics rendering engines 120, and various communication channels 125.

The storage 110 may be physical system memory, which may be volatile, non-volatile, or some combination of the two. Accordingly, the storage 110 may be referred to as a "hardware storage device" on which computer-executable instructions are stored. The term "memory" may also be used herein to refer to non-volatile mass storage such as physical storage media. If the computer system 100 is distributed, the processing, memory, and/or storage capability may be distributed as well. As used herein, the term "executable module," "executable component," or even "component" can refer to software objects, routines, or methods that may be executed on the computer system 100. The different components, modules, engines, and services described herein may be implemented as objects or processors that execute on the computer system 100 (e.g., as separate threads).

The disclosed embodiments may comprise or utilize a special-purpose or general-purpose computer including computer hardware, such as, for example, one or more processors (such as hardware processing unit 105) and system memory (such as storage 110), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware/physical storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 100 may also be connected (via a wired or wireless connection) to external sensors (e.g., data acquisition devices). Further, the computer system 100 may also be connected through one or more wired or wireless network(s) 130 to remote systems(s) that are configured to perform any of the processing described with regard to computer system 100.

The graphics rendering engine 120 is configured, with the hardware processing unit 105, to render one or more objects on a display of the computer system 100. As a result, a user is able to view the results of the various functionalities of the computer system 100.

A "network," like the network(s) 130 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. As illustrated, the computer system 100 includes one or more communication channels 125 (e.g., a TCP port, a UDP port, etc.) that are used to communicate with the network(s) 130. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, cloud-based machines and infrastructures, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components. For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

As discussed above, computer systems are able to provide a broad variety of different functions. According to the principles disclosed herein, the embodiments are able to provide a multi-file real-time collaboration environment. Within this environment, the embodiments are able to maintain consistency between a file's changing state and any entities that are tracking that file. Furthermore, the embodiments are able to handle language service requests using information learned from tracking the file's state. Accordingly, attention will now be directed to FIGS. 2 through 9, which figures present various architectures and supporting illustrations for establishing this collaboration session. Following that discussion, the disclosure will turn to FIGS. 10A through 13 to discuss how the collaboration session may be used to track a file's changing state. Later, FIGS. 14 and 15 will be used to demonstrate how the language service responds to language service requests.

Collaboration Session

Figure 2:
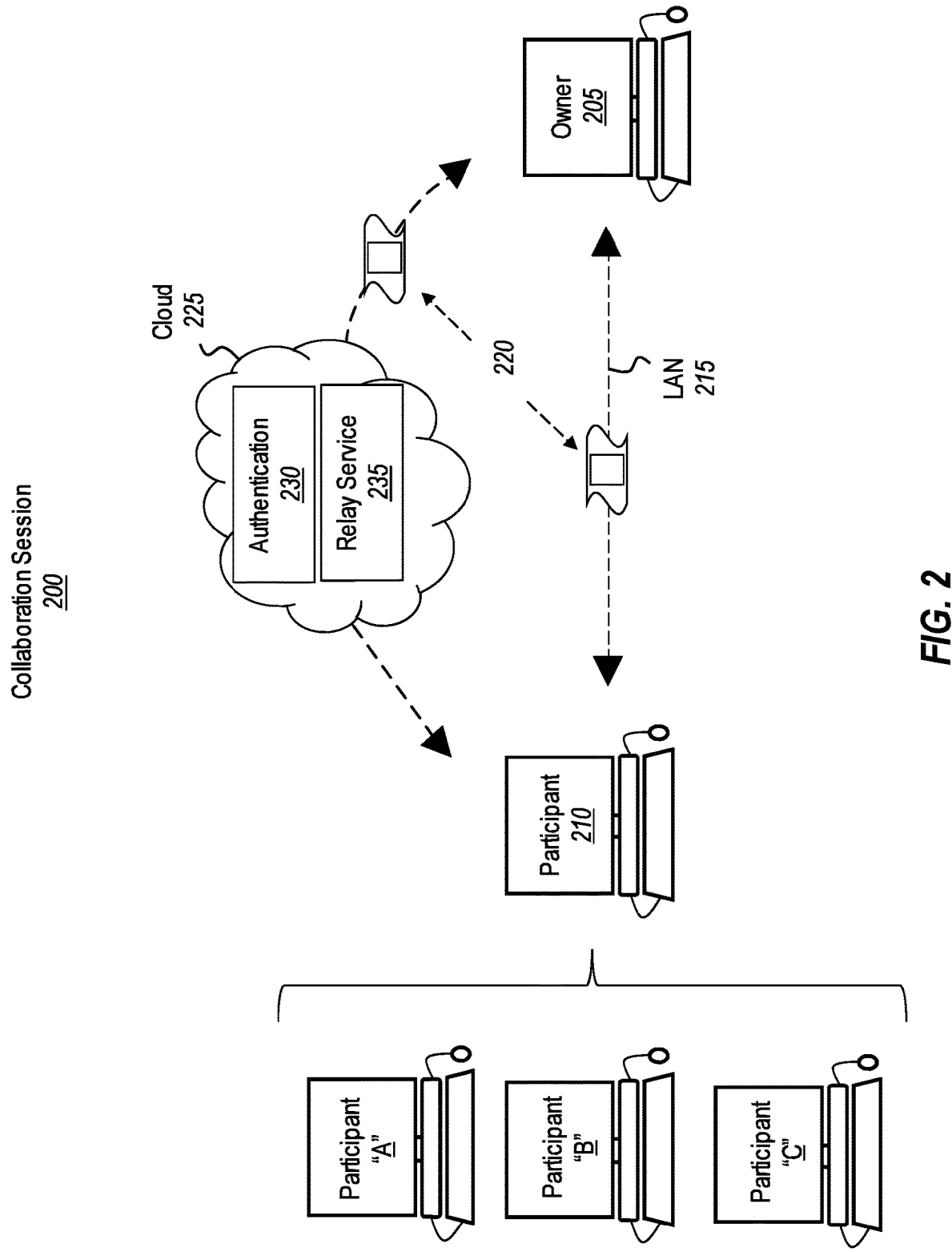
FIG. 2 provides an example depiction of how a collaboration session may be initiated.

FIG. 2 illustrates a collaboration session 200 in which an owner computer system 205 and a participant computer system 210 are both members. Notably, both the owner computer system 205 and the participant computer system 210 may include some or all of the features and functionalities that were discussed in relation to the computer system 100 of FIG. 1. Accordingly, when reference is made to a "computer system," such a system may include the features of computer system 100.

Here, it will be appreciated that there may be any number of participant computer systems in the collaboration session 200. For instance, FIG. 2 shows that Participant "A," Participant "B," and/or Participant "C" may be included in the collaboration session 200. As a result, the owner computer system 205 may be a first member in the collaboration session 200, Participant "A" may be a second member in the collaboration session 200, Participant "B" may be a third member in the collaboration session (i.e. three or more members are joined), and so on with potentially no limit. Accordingly, FIG. 2 is for example purposes only and should not be considered limiting. Furthermore, the remaining portion of this disclosure focuses on collaboration sessions that depict only a single participant; however, it should be understood that the principles may be practiced with any number of participants.

Returning to FIG. 2, the disclosed embodiments establish the collaboration session 200 so that the participant computer system 210 is able to gain access to a multi-file workspace stored on the owner computer system 205. In this manner, the participant computer system 210 can operate on the remote workspace as if the remote workspace were local. For instance, a human participant can independently view, edit, or otherwise operate on the remote workspace. By creating this type of collaboration session, all of the collaborators (e.g., the owner and participant(s)) are all able to collaborate on a single multi-file workspace. Accordingly, the disclosed embodiments provide many efficiencies over traditional collaboration processes.

Here, the collaboration session 200 may be initiated in a variety of ways. In some embodiments, the collaborators (e.g., the owner computer system 205 and the participant computer system 210) are able to communicate with each other over a local area network (LAN) connection 215. When this type of connection is available, then the collaboration session 200 may be initiated by sending a request 220 over the LAN connection 215. In this manner, the collaborators are able to communicate directly in a peer-to-peer manner.

In some instances, the owner computer system 205 may desire that the participant computer system 210 be authenticated prior to entering the collaboration session 200. As such, some implementations are able to use the cloud 225 to provide authentication services. For example, some implementations optionally provide an authentication service 230 in the cloud 225. The participant computer system 210 can use this authentication service 230 to authenticate itself to the owner computer system 205. After the authentication is complete, then the collaboration session 200 can be initiated, and the owner computer system 205 and the authenticated participant computer system 210 can jointly work on a multi-file workspace.

In other circumstances, the collaboration session 200 is initiated by sending the request 220 through a relay service 235 operating in the cloud 225. Here, this relay service 235 is able to connect computers that are on different native networks. Accordingly, the embodiments are able to use various services residing in the cloud 225 in order to initiate the collaboration session 200.

Other embodiments use a hybrid approach to initiating the collaboration session 200. For instance, if some participant computer systems are located on the same LAN as the owner computer system 205, then the request 220 can be sent to those participant computer systems using the LAN. Additionally, if some participant computer systems are not using the same LAN as the owner computer system 205, then the request 220 can be transmitted using the relay service 235 in the cloud 225. Accordingly, the disclosed embodiments are able to use a variety of methods for initiating the collaboration session 200. Here, it is worthwhile to note that the disclosed embodiments are able to intelligently select whichever process is most efficient to initiate the collaboration session 200. On a related note, the collaboration session 200 is able to continue to use the respective network connections to maintain the communications between the collaborators.

Ending the collaboration session 200 may be performed in a variety of ways. In some circumstances, the collaboration session 200 ends through an action of one of the collaborators. For example, one of the collaborators may select an "End Collaboration" option.

In another circumstance, the collaboration session may end upon expiration of a time-out period. For example, the owner may have configured a policy controlling how long the collaboration session will remain active. Upon expiration of that period, the participants' connection to the collaboration session will be terminated. Additionally, the owner may set a policy indicating a time-out period associated with the shutting down of a client (e.g., an IDE). For example, the owner may set a time-out period to cause the collaboration session to terminate after a predetermined period of time has elapsed after the client was shut down. Such a feature is beneficial because it provides the collaborators adequate time to save any changes or to provide documentation within the code.

Alternatively, other implementations are configured to end the collaboration session when the owner computer system shuts down and/or when the owner logs off of the owner computer system. In yet another alternative implementation, the collaboration session may continue to run even after the owner computer system has shut down, gone to sleep, or been logged off. As an example, suppose the human owner decided to perform a quick reboot or had to quickly attend a meeting. Here, because the collaboration session is still active (even though the owner computer system may not be active), the human owner will be able to quickly resume her work when she returns from her activities.

An advantage realized by this implementation is that if any configuration options are adjusted, then those adjustments can be persisted and will be in place for the remaining duration of the collaboration session. In this manner, the collaborators will be able to quickly resume working at the locations where they left off, and they can continue to operate using the same configuration options.

Other embodiments include audit tracking features that record each collaborators' actions (e.g., their edits). In this manner, these implementations provide an audit trail that can be reviewed and analyzed at a later time, if the need or desire arises. Once the collaboration session ends based on the principles discussed above, then the audit tracking may also end.

Figure 3:
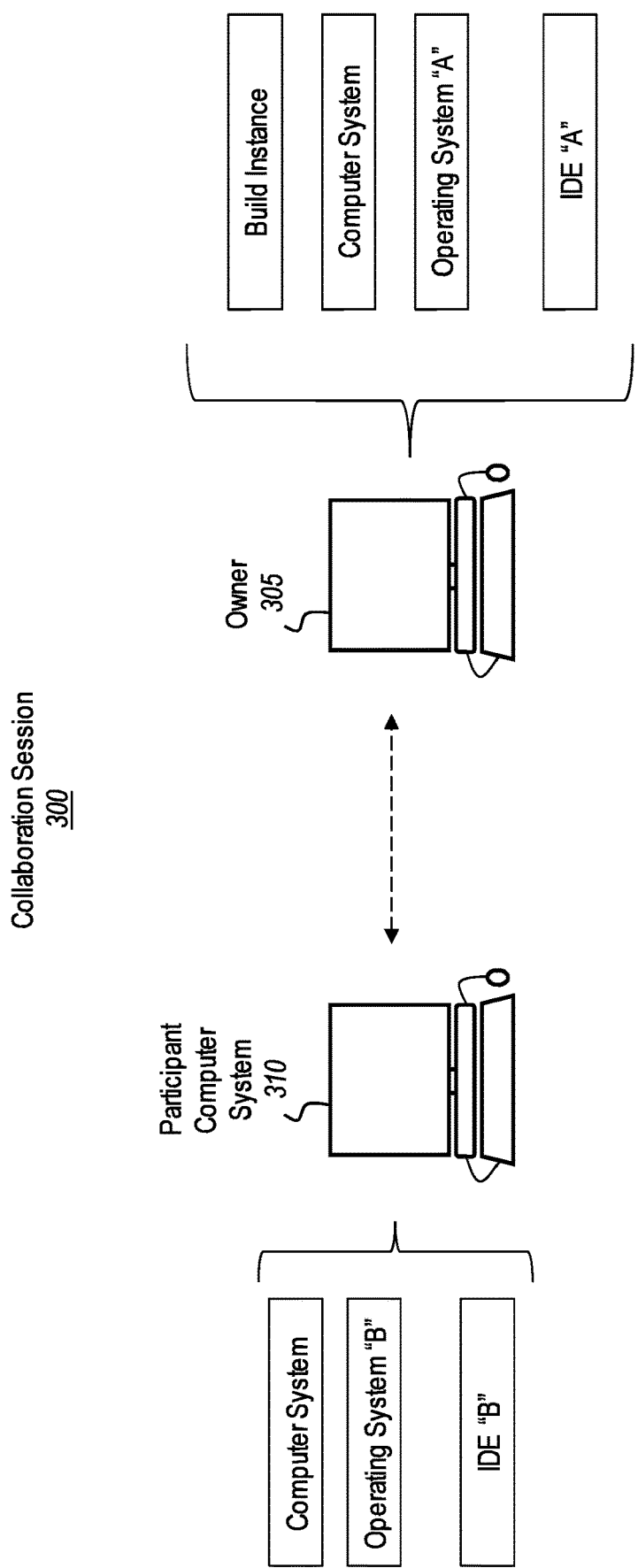
FIG. 3 illustrates the various forms and characteristics that a collaborator may have.

Similar to FIG. 2, FIG. 3 illustrates another collaboration session 300. Here, the collaboration session 300 is an example implementation of the collaboration session 200 of FIG. 2. In the scenario presented in FIG. 3, the collaboration session 300 includes an owner 305 and a participant computer system 310.

In particular, FIG. 3 shows some of the various characteristics that the owner 305 and the participant computer system 310 may have. As an example, the owner 305 may not be a computer system with a human operator. Instead, it may be a build instance of an application, as shown in FIG. 3. On a related note, the owner 305 may be a headless build instance that is residing in the cloud. In such a scenario, then the various participants are able to operate on the codebase on which the build instance is based.

Alternatively, the owner 305 may be a computer system (as shown in FIG. 3) that is using a first type of operating system (e.g., Operating System "A"). In some situations, a human owner will operate the owner 305. Furthermore, the human owner is able to perform work on the multi-file workspace through the use of a client application that is residing on the owner 305. As used herein, a "client application" may be any type of application that enables the owner 305 to operate on the multi-file workspace.

In situations where the multi-file workspace is a collection of text files, a client application may be a text editor, a word processing program, or any other program suitable to operate on the text files. In situations where the multi-file workspace is a collection of source code files, a client application may be a source code editor, an integrated development environment (IDE), or any other program suitable to operate on source code. Here, it will be appreciated that these client applications are provided permissions to access the multi-file workspace residing on the owner 305. Although FIG. 3 shows that the owner 305 is able to operate a client application that is in the form of an IDE (e.g., IDE "A"), any type of client application may be used, not just an IDE.

Turning now to the participant computer system 310, the participant computer system 310 may also be a computer system that is using an operating system (e.g., Operating System "B"). In some circumstances, Operating System "B" may be different than Operating System "A." As a result, the owner 305 and the participant computer system 310 need not use the same type of operating system in order to be joined together in the collaboration session 300 and to work on the multi-file workspace.

Relatedly, the participant computer system 310 need not use the same type of client application (e.g., IDE "B") as the owner 305. Therefore, according to the principles disclosed herein, a participant is able to use his/her preferred operating system and client application regardless of the type of operating system and/or client application that the owner (e.g., owner 305) is using. Accordingly, the embodiments are operating-system-agnostic and client-application-agnostic.

Up to this point, the disclosure has presented some of the ways in which a collaboration session may be initiated and some of the characteristics of the collaborators. In light of that background, attention will now be directed to FIG. 4, which presents some architectural components that may be used to realize the benefits of the disclosed principles.

Figure 4:
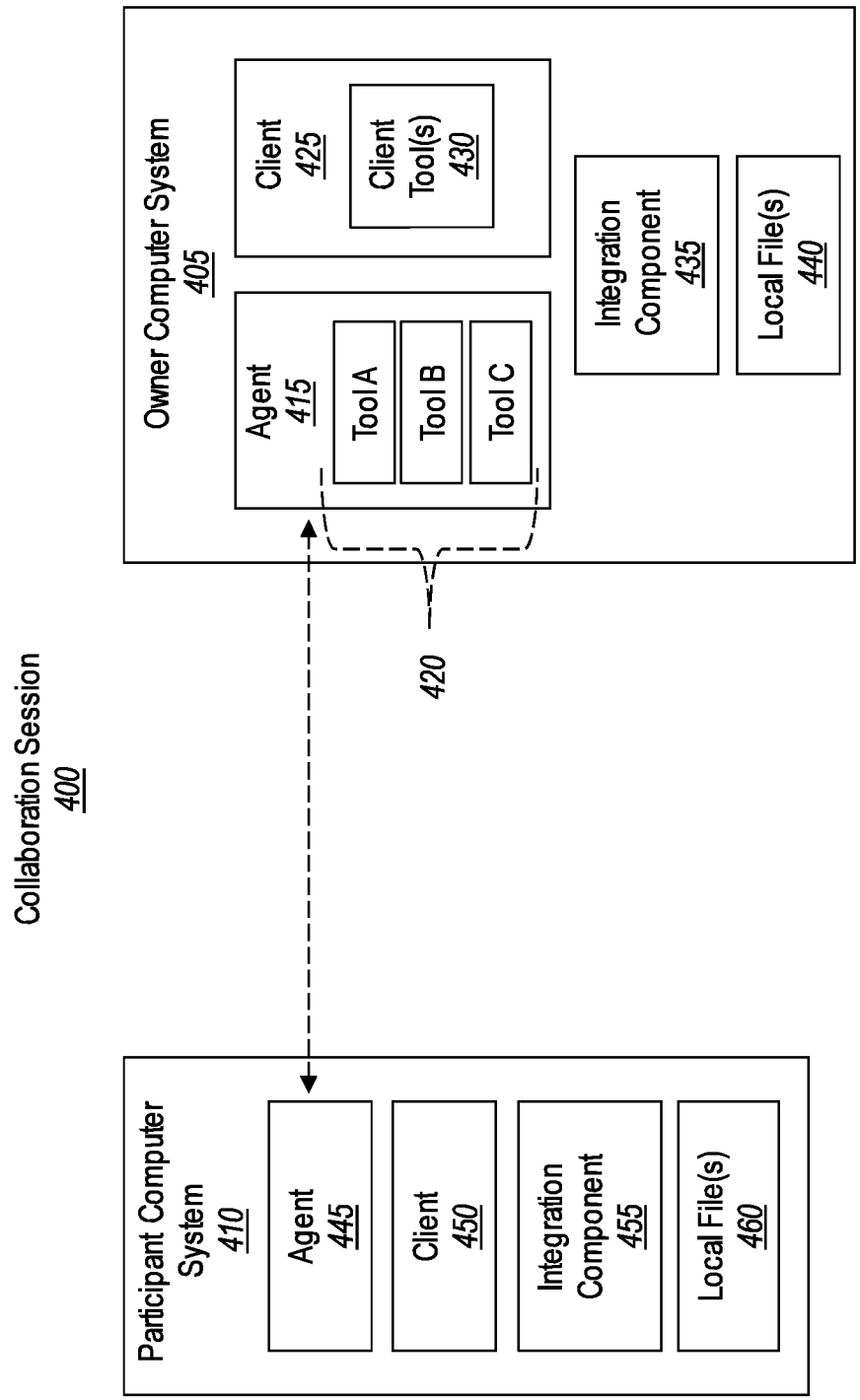
FIG. 4 illustrates an example architecture that may be used to facilitate a collaboration session.

FIG. 4 illustrates a collaboration session 400 in which an owner computer system 405 and a participant computer system 410 are members. Here, the owner computer system 405 is a computer system that includes a collaboration agent 415. As illustrated, this collaboration agent 415 includes a set of base tools 420 (e.g., Tool A, Tool B, and Tool C). Although FIG. 4 shows the collaboration agent 415 as including only three base tools, it will be appreciated that the collaboration agent 415 may include any number of base tools. Additional details on the base tools 420 will be presented momentarily.

The owner computer system 405 also includes a client application 425. As discussed earlier, a client application (e.g., client application 425) may be a text editor, word processing editor, source code editor, IDE, or any other type of application that enables a user to operate on a multi-file workspace. In light of that understanding, client application 425 may include a client tool 430.

Similar to the above disclosure, although the client application 425 is shown as including only a single tool, the client application 425 may actually have any number of tools. Relatedly, the owner computer system 405 may have any number of client applications installed thereon. As an example, the client application 425 may be an integrated development environment (IDE) that has permissions to access the multi-file workspace. Further, this IDE may manage/host a set of client development tools. In this manner, the IDE can be used to work on the multi-file workspace.

Here, it will be appreciated that a base tool (e.g., Tool A, Tool B, or Tool C) may be a service or other type of function/tool that is generally common across many or all of the different types of client applications. For example, in the context of code editing, the base tools 420 may include a code completion service, a code debugging service (e.g., a source code error checking tool), a code highlighting service, a code navigation operation/service, a code colorization service (e.g., syntax highlighting in which different colors are applied to the syntax depending on what category a syntax term belongs to), a code refactoring service (e.g., restructuring code without altering its behavior), a code hinting service (e.g., code completion), a source code search tool, a source code control tool, and/or a lightbulb service (e.g., an icon service that provides an expanded display of options). These tools may be included as a part of a "language service" that is running on the owner computer system 405.

Additional services and tools include, but are not limited to, providing member lists, parameter information, symbol services, source code transpilation (e.g., changing the source code so it reads in a different coding language), hover features, smart typing abilities, and quick code information. Relatedly, the client tool 430 may be a tool that is specific to a particular client application and that is not generally common among different client applications. As an example, the client tool 420 may be a tool or service specific to a particular type of IDE.

According to the principles disclosed herein, the owner computer system 405 is able to make these set of development tools (i.e. both the set of base tools 420 and the client tool 430) accessible to the participant computer system 410. Because these tools reside on the owner computer system 405, the tools have access to the entire context of the multi-file workspace. By making the tools accessible to the participant computer system 410, a human participant is able to use the tools in light of the entire context of the multi-file workspace. In this manner, the collaborators are able to operate on the multi-file workspace using a set of tools that understand the workspace's entire context.

Returning to FIG. 4, the owner computer system 405 also includes an integration component 435 and a set of local files 440. Here, the multi-file workspace may be included within the set of local files 440 on the owner computer system 405.

As discussed earlier, it is often desirable to enable a team of developers to jointly work on a project. According to the principles discussed herein, the collaboration session 400 may be initiated so as to enable one or more participants (e.g., participant computer system 410) to join the owner computer system 405 in collaborating on a multi-file workspace that is stored locally on the owner computer system 405 (e.g., perhaps in the local files 440).

To achieve these benefits, some implementations cause the integration component 435 to attach, or rather "hook," to the client application 425 in a lightweight manner. For example, the integration component 435 may be a plugin or other type of client extension that hooks into the client application 425 to perform "redirection," "rerouting," and customization operations. For example, the integration component 435 (which is on the owner computer system 405) is configured to add additional functionalities to the client application 425. Of note, these additional functionalities are at least directed to establishing and maintaining the collaboration session 400.

To illustrate, FIG. 5 shows an owner computer system 500, which is an example implementation of the owner computer system 405 of FIG. 4. In FIG. 5, the owner computer system 500 includes a client application 505 and an integration component 510. The client application 505 is also shown as including a user interface 515. After the integration component 510 hooks itself onto the client application 505, then the integration component 510 is able to expand upon the abilities of the client application 505.

For example, in some circumstances, the integration component 510 will alter the user interface 515 so that it includes additional features related to a collaboration session. To illustrate, a set of new collaboration options 525 have been added to the user interface 515 as a result of the integration component 510 attaching itself to the client application 505. The set of new collaboration options 525 include Option 1, Option 2, and Option 3. The ellipsis 520 demonstrates that any number of options may be added to the user interface 515. Some of the set of collaboration options 525 may include, but are not limited to, (1) an option to initiate a collaboration session, (2) an option to terminate a collaboration session, and/or (3) an option to acquire information about a particular participant (e.g., the participant's avatar may be displayed and, when the avatar is selected, identifying information about the participant may also be displayed).

Another option is a "pin" to participant's position option. As discussed, the embodiments enable a participant to work on a multi-file workspace that is stored locally on an owner computer system. Included with this functionality is the ability of the participant to independently navigate to areas within the multi-file workspace where the owner computer system is not currently operating (or even in locations where the owner computer system is operating). Furthermore, the embodiments also enable the participant to independently edit files. In light of these abilities, an owner may desire to learn where a participant is currently navigating/operating within his/her multi-file workspace.

By selecting the pin to participant's position option (e.g., the options can be selectable buttons), the embodiments automatically navigate the owner to the same location as a participant within the workspace. If there are multiple participants, then the owner may initially be prompted to select a particular participant.

As an example, suppose an owner is editing File 1 shown in the user interface 515 in FIG. 5. At the same time, a participant may be independently editing File 2. By clicking the pin to participant's position option, the owner can be automatically navigated to File 2, and in particular to the exact location where the participant is editing File 2. Therefore, although participants are able to independently navigate and edit the files within the workspace, the owner can still be automatically directed to the locations within the workspace where the participants are working. In some implementations, this feature is also provided to each of the participants. Therefore, in these implementations, each collaborator is able to follow the actions of the other collaborators.

Another option that may be provided among the set of new collaboration options 525 is the option to adjust the access controls of the participants. For example, the owner may be provided with an option to adjust a policy so that participants are allowed to navigate to or edit only certain files. Yet another option is related to an audit feature in which the actions of the participants are recorded and are made available for viewing by the owner. Accordingly, the integration component 510 is able to interact with the client application 505 to enhance the owner's control over the participants in a collaboration session.

Returning to FIG. 4, attention will now be directed to the participant computer system 410. Here, the participant computer system 410 is shown as including a collaboration agent 445, a client application 450, an integration component 455, and local files 460. The collaboration agent 445 communicates with the collaboration agent 415 to provide the participant computer system 410 access to the multi-file workspace residing on the owner computer system 405. In this manner, communication between the owner computer system 405 and the participant computer system 410 is facilitated/conducted between the owner computer system's agent component (e.g., a collaboration agent 415) and the participant computer system's agent component (e.g., collaboration agent 445). Additional details on this interaction will be presented later. At this point, it is worthwhile to note that the client application 450 also provides a user interface to the participant so that the participant is able to view (and therefore work on) the multi-file workspace.

Similar to the integration component 435, the integration component 455 also attaches itself to the client application 450. The functionalities of this integration component 455 will now be discussed in relation to FIGS. 6A and 6B.

Figure 6B:
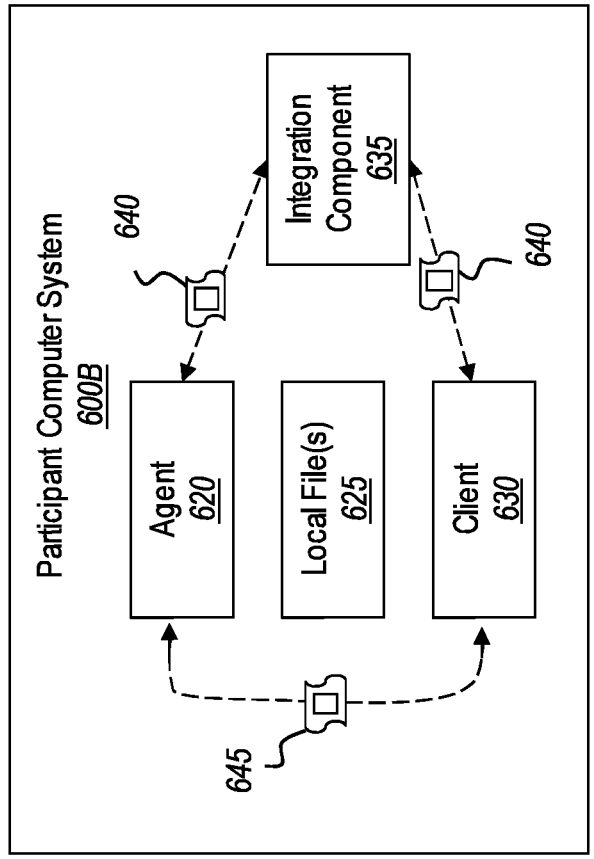
FIG. 6B illustrates how a client application's communications can be intercepted and re-routed.
Figure 6A:
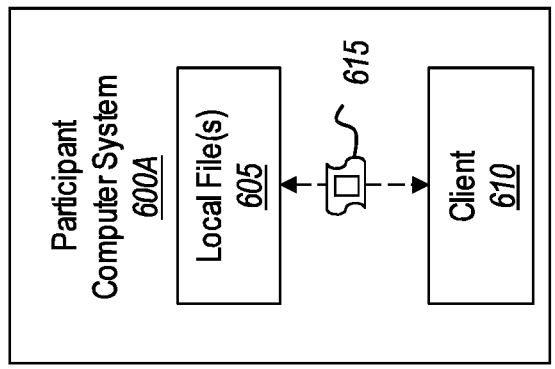
FIG. 6A illustrates how a client application is able to access the local files on a participant computer system.

FIG. 6A shows a participant computer system 600A that includes a set of local files 605, which are example implementations of the local files 460 from FIG. 4, and a client application 610. In this scenario, the participant computer system 600A does not have an integration component. Accordingly, when the participant computer system 600A is thusly configured, the client application 610 is able to submit requests 615 to the set of local files 605. In this manner, the client application 610 operates on files that are stored locally on the participant computer system 600A.

To enable a participant computer system to operate on a remote multi-file workspace in an operating-system-agnostic and client-application-agnostic manner, the participant computer system uses a collaboration agent and an integration component. These features are shown in FIG. 6B. For example, the participant computer system 600B of FIG. 6B includes a collaboration agent 620, a set of local files 625, a client application 630, and an integration component 635. After attaching itself to the client application 630, the integration component 635 is able to intercept requests 640 that are issued by the client application 630. Normally, these requests 640 would be fulfilled using the set of local files 625. Now, instead of the requests 640 being fulfilled using the information from the set of local files 625, the integration component 635 intercepts those requests 640 and routes the intercepted requests 640 to the collaboration agent 620. Once the requests 640 are received, the collaboration agent 620 then routes the intercepted requests 640 to a collaboration agent residing on the owner computer system (e.g., collaboration agent 415 in FIG. 4).

Turning briefly to FIG. 7, FIG. 7 shows how an owner-side collaboration agent handles requests that are received from a participant-side collaboration agent. Here, the collaboration session 700 includes an owner computer system 705 and a participant computer system 710. The owner computer system 705 includes a collaboration agent 720, a set of base tools 725, a set of client tools 730, and a set of local files 735. The ellipsis 740 demonstrates that the owner computer system 705 may have additional features (e.g., a language service).

In this scenario, a participant-side collaboration agent is able to receive an intercepted request as described in connection with FIG. 6B. This request is shown as request 715 in FIG. 7. Here, the participant-side collaboration agent transmits the request 715 to the collaboration agent 720. After receiving the request 715, the collaboration agent 720 then processes the request 715.

In some instances, processing the request 715 includes making the set of base tools 725 accessible to the participant computer system 710. Relatedly, processing the request 715 may include making the set of client tools 730 accessible to the participant computer system 710. In other instances, processing the request 715 may include making the set of local files 735 accessible to the participant computer system 710. In this manner, a multi-file workspace residing on the owner computer system 705 may be made accessible to the participant computer system 710. In some instances, processing the request 715 includes making edits to the files in the multi-file workspace. Edits include, but are not limited to, changing text within the file, adding a new file, deleting an existing file, or any other file editing operation.

Here, it is worthwhile to note that the participant computer system 710 is not downloading the multi-file workspace. Instead, it is being given access to the workspace through the use of its collaboration agent, its integration component, and the owner-side collaboration agent. In this manner, the participant computer system 710 is able to reach across and perform work on the owner computer system 705's multi-file workspace. After the request 715 is processed by the owner computer system 705, the collaboration agent 720 then transmits a response back to the participant computer system 710. In particular, the collaboration agent 720 transmits the response back to the participant-side collaboration agent.

Returning to FIG. 6B, the collaboration agent 620 will then receive any responses generated by the owner computer system. Once a response is received, then some embodiments will cause the response to be transmitted back to the client application 630 via the integration component 635. In other embodiments, however, the collaboration agent 620 is able to directly transmit the response (e.g., response 645) to the client application 630. In this manner, the participant is able to see the results of his/her processed requests.

Here, an example will be helpful. Suppose an owner establishes a collaboration session in which a participant is a member. The owner has asked the participant to assist him/her in debugging source code. The owner begins by debugging a first file while the participant begins by debugging a second file. Of note, both of these files are included in the multi-file workspace and both are stored on the owner's computer system. In this example, the second file is displayed on the participant's computer system even though the file's contents are actually stored only on the owner's computer system.

Additionally, the participant is able to independently view and edit the contents of the second file even though the owner is currently working on the first file. In this manner, multiple collaborators are able to jointly work on a single multi-file workspace. In some instances, the owner and the participant will be working on the same file. When such a scenario is present, then the owner will be able to see (in real-time) the changes made by the participant, and the participant will be able to see (in-real time) the changes made by the owner. Accordingly, the changes made by the collaborators are made in real-time and are synchronized with each other. In light of this discussion, it will be appreciated that the participant is given the illusion that he/she is working on a local workspace whereas, in actuality, the workspace is not local.

By following these principles, the disclosed embodiments are able to provide a participant computer system access to a multi-file workspace that is stored on the owner computer system. Furthermore, a human participant is able to view that workspace and to edit that workspace. This viewing and editing can be performed independently of any viewing and editing that an owner may be performing on the multi-file workspace. In this manner, a participant no longer needs to replicate a workspace's context in order to work on that workspace. Additionally, the participant is able to use his/her preferred client application, even if that client application is different from the owner's client application. Even further, the participant is able to use the owner's set of tools, which tools understand the entire context of the multi-file workspace.

Figure 8:
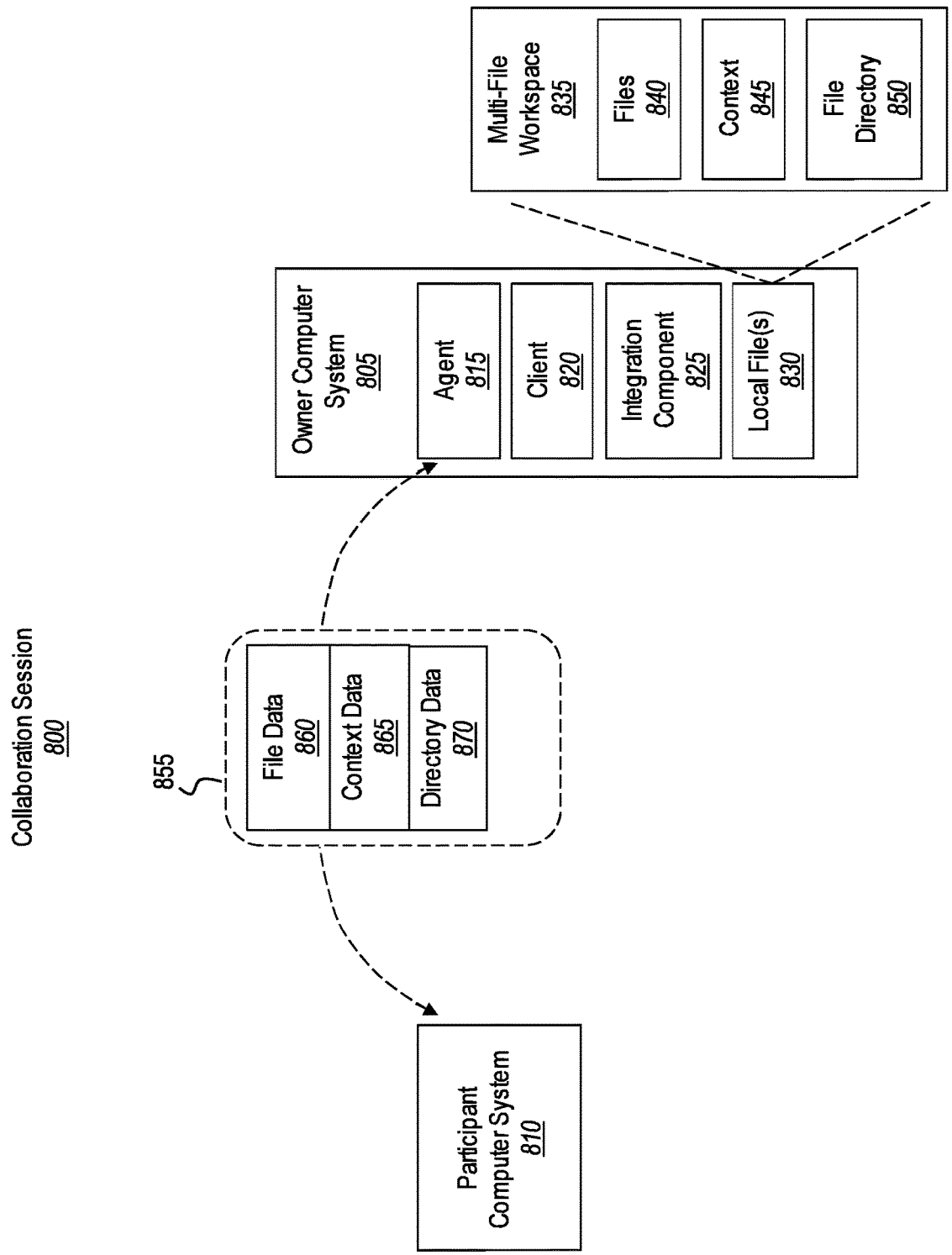
FIG. 8 demonstrates how a multi-file workspace can become accessible to a participant computer system.

Attention will now be directed to FIG. 8, which provides additional details for enabling a participant to collaborate on a multi-file workspace. Here, the collaboration session 800 includes an owner computer system 805 and a participant computer system 810. The owner computer system 805 includes a collaboration agent 815, a client application 820, an integration component 825, and a set of local files 830. The set of local files 830 includes a multi-file workspace 835. Here, this multi-file workspace 835 includes a set of files 840, a context 845 of the multi-file workspace 835, and a file directory 850.

When the collaboration agent 815 receives a request from the participant computer system 810 according to the manner just described, the collaboration agent 815 is able to process the request and return a response 855 to the participant computer system 810. As shown, this response 855 may include file data 860 (i.e. data concerning the set of files 840), context data 865 (i.e. data concerning the context 845), or directory data 870 (i.e. data concerning the file directory 850).

In some instances, this data is metadata while in other instances this data enables the participant computer system 810 to display the multi-file workspace and receive edits directed to the multi-file workspace. In this manner, providing the participant computer system 810 access to the multi-file workspace includes providing access to the workspace's file directory, context, and files. From this information, the multi-file workspace 835 can be displayed on the participant computer system 810, and the participant will be able to operate on that multi-file workspace.

From the above disclosure, it will be appreciated that the owner computer system 805 is transmitting sufficient information (e.g., metadata and other information) so that the participant computer system 810 is able to understand what is included within the multi-file workspace 835. Furthermore, the participant computer system 810 is able to receive enough information so that a visualization of the multi-file workspace 835 may be rendered on a user interface of the participant computer system 810. In this manner, the participant computer system 810 is acting as a headless entity because a majority of the operations are actually being performed on the owner computer system 805.

For example, the participant computer system 810 submits viewing and editing requests to the owner computer system 805. The owner computer system 805 then processes those requests and returns results back to the participant computer system 810. As such, the participant computer system 810 is provided the illusion that it is working on a local workspace, but in actuality the workspace is not local and the operations on the workspace are being performed by the owner computer system 805.

Figure 9:
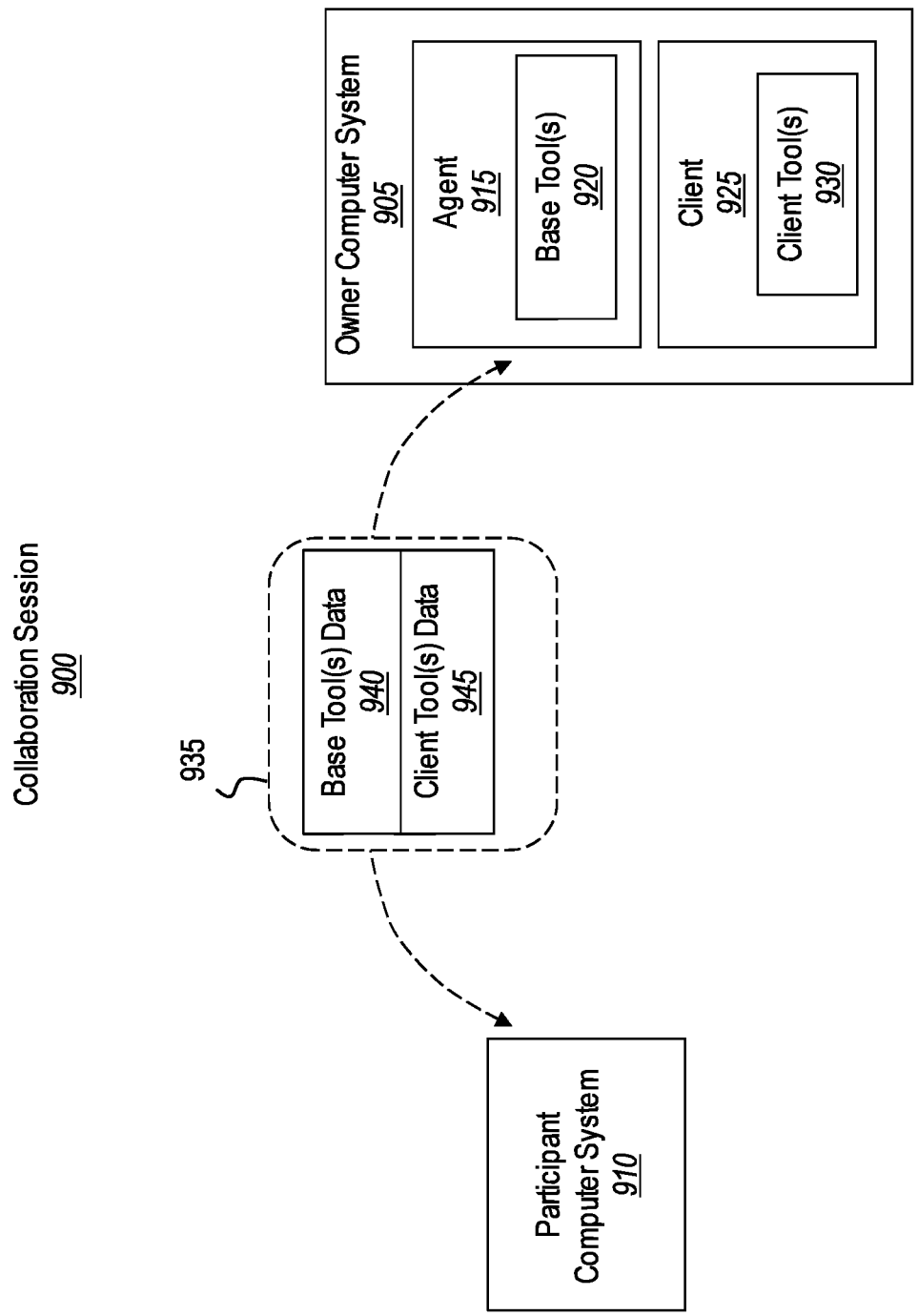
FIG. 9 demonstrates how the tools of an owner computer system can become accessible to a participant computer system.

FIG. 9 shows some additional operations that may be performed. Here, the collaboration session 900 includes an owner computer system 905 and a participant computer system 910. The owner computer system 905 includes a collaboration agent 915. As discussed, this collaboration agent 915 is able to maintain a set of base tools 920. The owner computer system 905 also includes a client application 925, which is able to maintain a set of client tools 930.

According to the principles discussed herein, the embodiments are also able to make the set of base tools 920 and the set of client tools 930 accessible to the participant computer system 910. For example, the participant computer system 910 is able to use the tools that are residing on the owner computer system 905 in order to perform operations on the owner computer system 905's multi-file workspace. Therefore, not only is the participant computer system 910 able to view and edit the multi-file workspace on the owner computer system 905, but it is also able to make use of the tools that are on the owner computer system 905. The participant computer system 910 is able to receive information 935 that includes base tool data 940 and/or client tool data 945. In this manner, the participant computer system 910 is able make use of the owner computer system 905's development tools.

Tracking Edits Made to a File

The above disclosure focused on an example environment in which some of the embodiments may be practiced. Therefore, considering the above example environments, attention will now be directed to FIGS. 10A through 13B which describe various implementations for tracking multiple, simultaneous edits made to a file to ensure that a language service is able to properly respond to language service requests (such as a completion request) even when those requests are directed to a file that is changing. As described above, in many instances, these edits are occurring simultaneously with each other. In this regard, the embodiments beneficially provide solutions for monitoring simultaneous edits and ensuring that those edits are properly characterized so that the language service is able to provide a correct response to any language service requests.

Because the collaborators operate in an environment where multiple edits can be executed against a file simultaneously, it is beneficial to monitor how those edits occur so that all of the collaborators are provided with an accurate representation of how that file is changing (i.e. how the file is being edited) in response to the edits. At this point, an example will be helpful.

As an initial matter, consider a situation in which multiple collaborators are joined in a collaboration session (e.g., collaboration session 900 shown in FIG. 9) and are working to edit a file that includes actual source code. In FIG. 10A, the source code 1000A illustrates a representation of Participant 1's "understanding" of what the file that includes the actual source code looks like at a given point in time. Here, the given point in time corresponds to when the file was originally at version 0.

Regarding the concept of an "understanding," Participant 1 is able to maintain an operation buffer that is used to monitor and record tracked changes (i.e. edits) made to the file containing the actual source code. This operation buffer is separate from the file because the file is stored on the owner computer system whereas Participant 1 maintains its own operation buffer. Examples of an operation buffer include, but are not limited to, a dedicated portion in memory for monitoring and maintaining state, a register, a queue, a log, or any other component that can be used to monitor edits that are made to the file. The operation buffer is able to monitor the file's edits by receiving publications indicating that a tracked change to the file has occurred (i.e. the edit). In many instances, multiple edits may be occurring simultaneously. By maintaining and organizing the publications, the operation buffer is able to obtain (perhaps with some delay) an accurate representation of what the file looks like, even in light of the multiple, simultaneous edits. Therefore, when reference is made to an entity's "understanding," that reference is referring at least to the entity's operation buffer, which is being used to monitor the edits that are being performed against the file. It should be noted that data may be added to or removed from an operation buffer in any order and at any time so long as the operation buffer eventually obtains an accurate representation of the edits that are made to the file.

As shown in FIG. 10A, Participant 1 initially understands that the file containing the actual source code is at file version "0." In other words, Participant 1's operation buffer includes information corresponding to the file's state (e.g., any edits that have been executed against the file), and that information indicates that the file is presently at version 0. Of course, this number is being used for example purposes, and it should not be considered as binding.

Any of the collaborators (e.g., Participant 1) can submit edit requests against the actual source code. For instance, as represented by edit 1005A, Participant 1 has submitted an edit request indicating that the text "FINITE" should be entered at line 11 in the actual source code. When the edit request is actually processed, then the file version of the file containing the actual source code should eventually transition from version 0 to version 1 when the letter "F" is entered, from version 1 to version 2 when the letter "I" is entered, from version 2 to version 3 when the letter "N" is entered, and so on. In a corresponding manner, Participant 1's understanding of the actual source code, which understanding is represented by the source code 1000A, should also update to reflect the changes as well.

Because the collaborators may be located very far from one another (e.g., on different continents) and because the collaborators are all working on the same workspace (which is stored on the owner computer system), there might be an amount of latency associated with Participant 1's edit 1005A. To clarify, the edit 1005A may be delayed in reaching the owner computer system such that there may be a delay in actually executing the edit 1005A against the file containing the actual source code.

As such, the other collaborators in the collaboration session may not become aware of the edit 1005A for some time. Such a scenario is shown in FIG. 10B. Here, this figure shows source code 1000B which represents Participant 2's understanding of what the file that contains the actual source code looks like (e.g., by tracking the edits made to the file). Similar to Participant 1, Participant 2 also maintains an operation buffer that is used to track edits made to the file. In this scenario, Participant 2's operation buffer includes information indicating that the actual source code is still at version 0. As a result, Participant 2's operation buffer has not yet been updated to reflect the "FINITE" edits.

Now suppose that Participant 2 submits an edit request that is also to be executed against the file containing the actual source code. For instance, as represented by edit 1005B in FIG. 10B, Participant 2 desires to enter the text "DEF" at line 14 of the actual source code. When this edit request is processed, then the file version of the file containing the actual source code should eventually transition from version 0 to version 1 when the letter "D" is entered, from version 1 to version 2 when the letter "E" is entered, and from version 2 to version 3 when the letter "F" is entered. In a corresponding manner, Participant 2's understanding of the actual source code, which understanding is represented by the source code 1000B, should also update to reflect the changes/edits as well. Recall, however, that this same file is supposed to be updated to reflect the "FINITE" edits that were made earlier. As a consequence, a conflict will arise. This conflict will arise because Participant 2 is operating with an understanding that a language service request will occur on line 14 and at the location immediately after the letter "F." Once "FINITE" arrives, however, the language service may have an incorrect understanding of what specific language service request is to be executed at the location right after the letter "F" because of the arrival of the new text "FINITE" and the impact that the new text has. In this manner, the language service may provide an incorrect response to a language service request because the language service may not correctly understand where the language service request is to occur.

Accordingly, FIG. 10C shows an example scenario in which the language service has incorrectly processed a language service request because it was operating with an incorrect understanding of the source code 1000C. For instance, the completion requests 1010 do not correspond with the text "DEF." Consequently, it is desirable to provide a mechanism that is able to monitor multiple simultaneous edits that are occurring on a file and to ensure that that language service is able to properly respond to a language service request, even in light of the multiple simultaneous edits. In this regard, the embodiments avoid the undesired situation shown in FIG. 10C.

For reference, a language service is a tool/service that can provide many different functionalities, which include, but are not limited to, code completion, code navigation, and code highlighting, just to name a few. Other examples of a language service request were described earlier in this disclosure. As a result, a language service "request" may include a code completion request, a code navigation request, and a code highlight request, just to name a few. Given the scenarios presented in FIGS. 10A, 10B, and 10C, the language service will not operate as desired. As such, conventional collaborative editing mechanisms are deficient and there is a need to enable the language service to maintain its own understanding (i.e. its own operation buffer) of the edits made to a file so that the language service can provide correct responses to requests, even when the file changes.

With that said, the disclosed embodiments provide significant advantages because they are able to track the edits that occur to a file and to ensure that edits are executed in a defined manner. Furthermore, the language service is able to track the edits made to a file so that it is able to provide correct responses to language service requests. Therefore, to achieve these benefits, FIGS. 11A and 11B illustrate example methods that may be performed to track edits made to a file to ensure that a language service is able to properly respond to language service requests (such as a completion request) even when those requests are directed to a file that is being simultaneously edited by multiple collaborators.

Figure 11A:
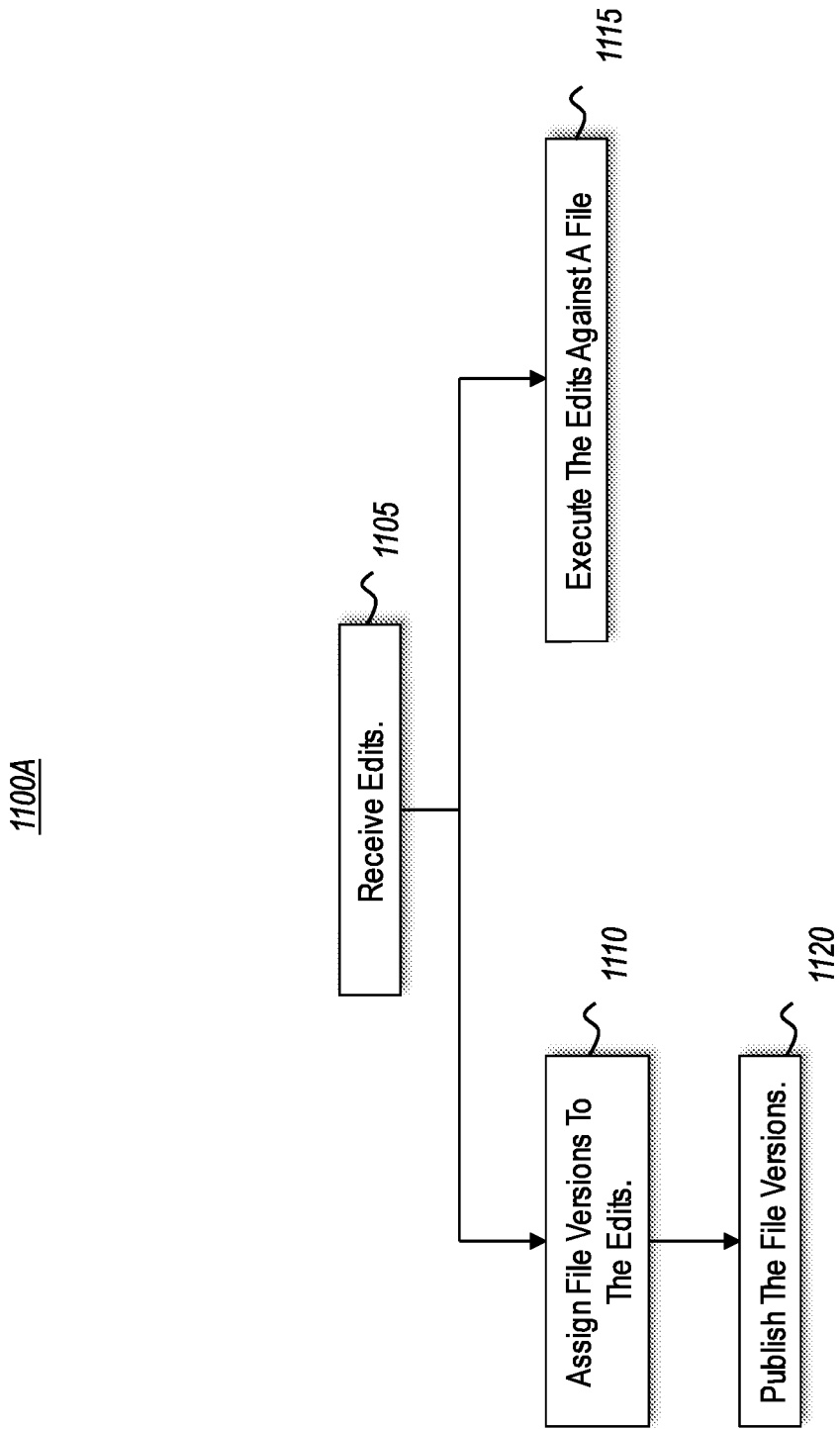
FIGS. 11A and 11B illustrate example methods for tracking edits made to a file in order to adequately respond to a language service request that is directed to that changing file.
Figure 11B:
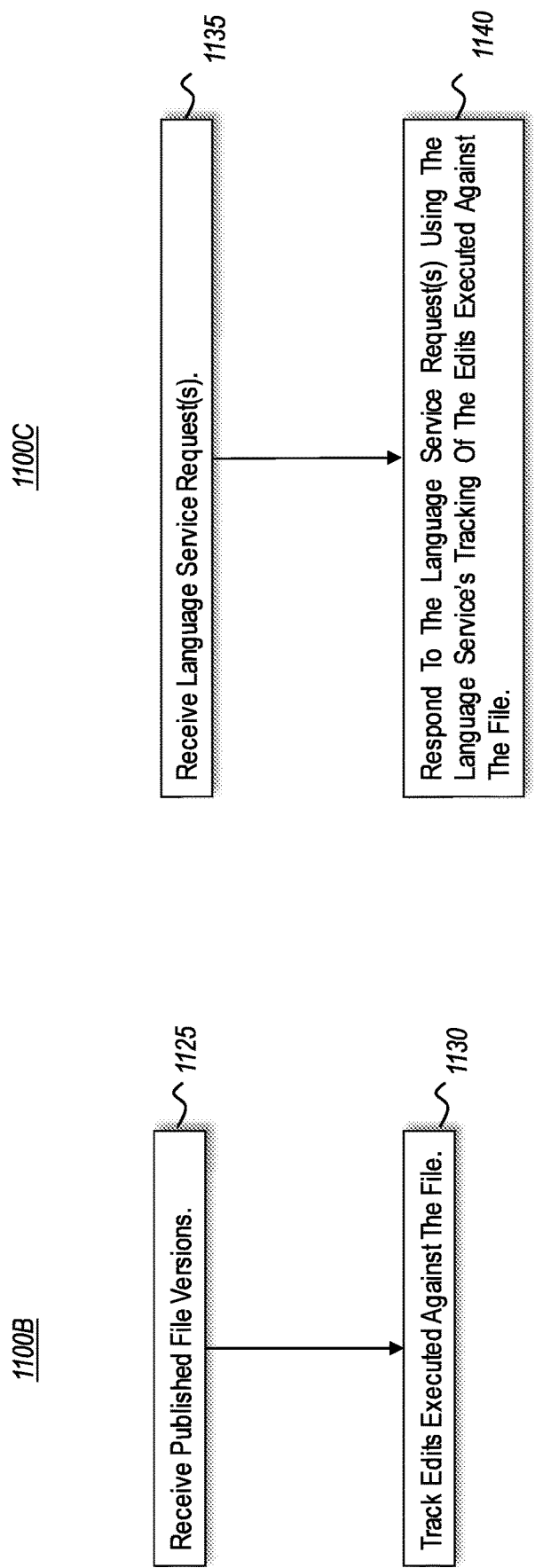

Method 1100A, which is illustrated in FIG. 11A, is from the point of view of an owner computer system. Here, the owner computer system is able to receive one or more edits that are to be executed against a file (act 1105). In some circumstances, the edits may be included within one or more messages. These messages may also include one or more language service requests, and they may be received within a collaboration session in which the owner computer system and a participant computer system are both members.

After receiving these edits, the owner computer system can then perform various different actions. One action involves assigning a file version to each of the edits (act 1110). Assigning file versions is beneficial because the file versions define an ordering for the edits in the subset of edits. For example, the defined ordering may be an execution order in which the edits will be executed against the file. As each of the edits in the subset is executed against the file (e.g., perhaps in accordance with the defined ordering), then a state of the file will change in a corresponding manner. As such, the embodiments are able to track the edits that are made to the file.

Another action includes executing the edits against the file (act 1115). FIG. 11A shows that, although not required, these actions may be performed in parallel such that there is no temporal dependency between the actions. Additionally, method 1100A includes an act (act 1120) of publishing the assigned file versions to one or more participant computer systems as well as to the language service.

FIG. 11B shows two additional methods, namely method 1100B and method 1100C. Here, these two methods are performed by the language service, which is operating on the owner computer system. Additionally, these two methods are illustrated next to each other to demonstrate that they may be performed in parallel without a temporal dependency on one another.

Method 1100B initially includes an act (act 1125) of receiving the published file versions. Once the language service receives the file versions, then it can use those file versions to track (act 1130) the edits that are made to the file in response to the edits that were described earlier. This process of tracking will be described in more detail later.

Method 1100C initially includes an act of the language service receiving one or more language service requests (act 1135). For instance, these requests may be included in the messages that were described earlier. In some circumstances, the one or more language service requests originate from the participant computer system while in other circumstances the requests originate from the owner computer system. In other scenarios, a combination of the above requests may be received. Regardless, by following the principles disclosed herein, the language service is able to handle and/or respond to any language service request received from any of the collaborators (e.g., the participant computer system and/or the owner computer system).

Next, method 1100C includes an act (act 1140) of causing the language service to respond to the one or more language service requests using the language service's tracking of the edits that were made to the file. This act is shown in parallel to the act 1130 from method 1100B to demonstrate that the language service, in some instances, is able to respond to requests even while the language service is in the process of tracking the edits made to the file. Furthermore, it should be noted that multiple edits may be made, simultaneously, against the file. As such, the embodiments are able to monitor the multiple, simultaneous edits.

Figure 12:
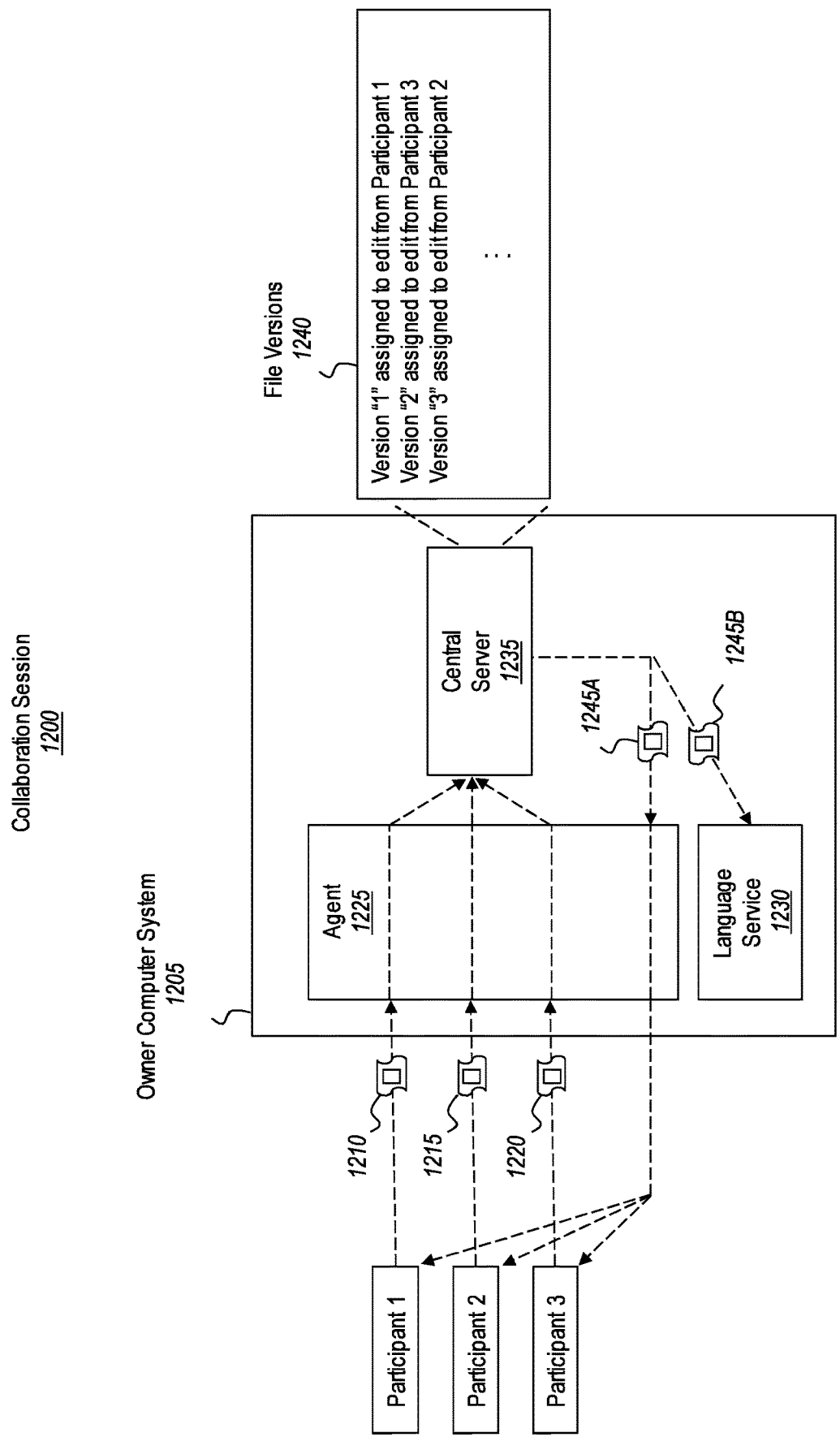
FIG. 12 illustrates an example architecture that may be used to facilitate the method described above.

Now that the principles for tracking edits that are to be executed against a file have been introduced, attention will be directed to FIG. 12. This figure illustrates an example architecture which may be used to perform the method acts described above.

Specifically, FIG. 12 shows a collaboration session 1200 that includes an owner computer system 1205 and multiple participant computer systems (e.g., Participant 1, Participant 2, and Participant 3). Although three participant computer systems are shown, any number of participant computer systems may be present (e.g., one, two, three, or more than three) in the collaboration session 1200.

Within this collaboration session 1200, the owner computer system 1205 is able to receive any number of messages. For example, FIG. 12 shows that the owner computer system 1205 is receiving message 1210 from Participant 1, message 1215 from Participant 2, and message 1220 from Participant 3. Here, these messages (i.e. messages 1210, 1215, and 1220) are received at a collaboration agent 1225 according to the principles described earlier. Furthermore, each of the messages 1210, 1215, and/or 1220 are directed towards a file that is stored on the owner computer system 1205. Even further, each of the messages 1210, 1215, and/or 1220 may include any number of edits (i.e. edit requests) and/or any number of language service requests.

If the messages 1210, 1215, and/or 1220 include language service requests, then it is desirable for the language service 1230 to handle these requests. To ensure that the language service 1230 handles these requests properly, it is beneficial to enable the language service 1230 to participate in monitoring how the file is edited.

Therefore, once the collaboration agent 1225 receives the messages 1210, 1215, and 1220, then some (or all) of those messages are passed to a central server component 1235. Here, this central server component 1235 is able to receive any number of messages and is able to determine how to handle those messages. In some instances, the central server component 1235 will determine that a subset of the messages will be executed against the file. Based on that determination, the central server 1235 can then assign a file version to some or all of the edit requests included in the messages (i.e. the subset of messages that will be executed against the file). This functionality is shown by the file version box 1240 in FIG. 12.

Once the central server component 1235 assigns the file versions to the edits, then the central server 1235 publishes those file versions. Here, the central server 1235 is able to publish the file versions to each of the participant computer systems (e.g., Participant 1, Participant 2, and Participant 3) as shown by the publication 1245A. Additionally, the central server 1235 is able to publish the file versions to the language service 1230 as shown by publication 1245B.

By receiving the publications 1245A and 1245B, the participant computer systems and the language service are able to track/monitor how the file changes in response to the edits (e.g., by monitoring the edits that are made to the file).

In this manner, the language service 1230 maintains its own understanding of the edits that are made to the file. To clarify, the language service 1230 maintains its own operation buffer in order to monitor the edits that are made to the file (e.g., by monitoring how the file changes in response to edits). Maintaining this operation buffer (i.e. an understanding) is beneficial because one of the language service's roles is to handle language service requests that are based on the file, and to do so even when the file changes.

The above discussion focused on a scenario in which the central server 1235 received multiple messages that included edit requests for a file. In some circumstances, however, the language service 1230 may receive its own type of messages (e.g., one or more language service requests that are also to be executed against that same file). Sometimes, these language service requests are routed directly to the language service 1230 from the agent 1225 as opposed to initially passing through the central server 1235. As a result, the language service 1230 may receive a language service request that is directed to a version of the file that is different than what the central server 1235, the language service 1230, or even the actual file is operating at.

By enabling the language service 1230 to track the edits that are made to a file, the language service 1230 will be able to properly handle the language service request even when the file is changing (e.g., by providing a response to the request, by delaying the request, by rolling back to an earlier file version, or by canceling the request). Accordingly, the architecture shown in FIG. 12 provides a venue for practicing the disclosed principles.

With that said, more detail will now be provided on how the embodiments monitor the edits that are made to a file to ensure that the edits made on that file are monitored consistently between multiple monitoring entities, which include the language service. In the following examples, emphasis is placed on the language service performing some of these operations. It is noted, however, that these operations may also be performed by any of the participant computer systems. Therefore, with that understanding, both the participant computer systems and the language service running on the owner computer system are able to participate in tracking the edits that are made to a file.

Figure 13A:
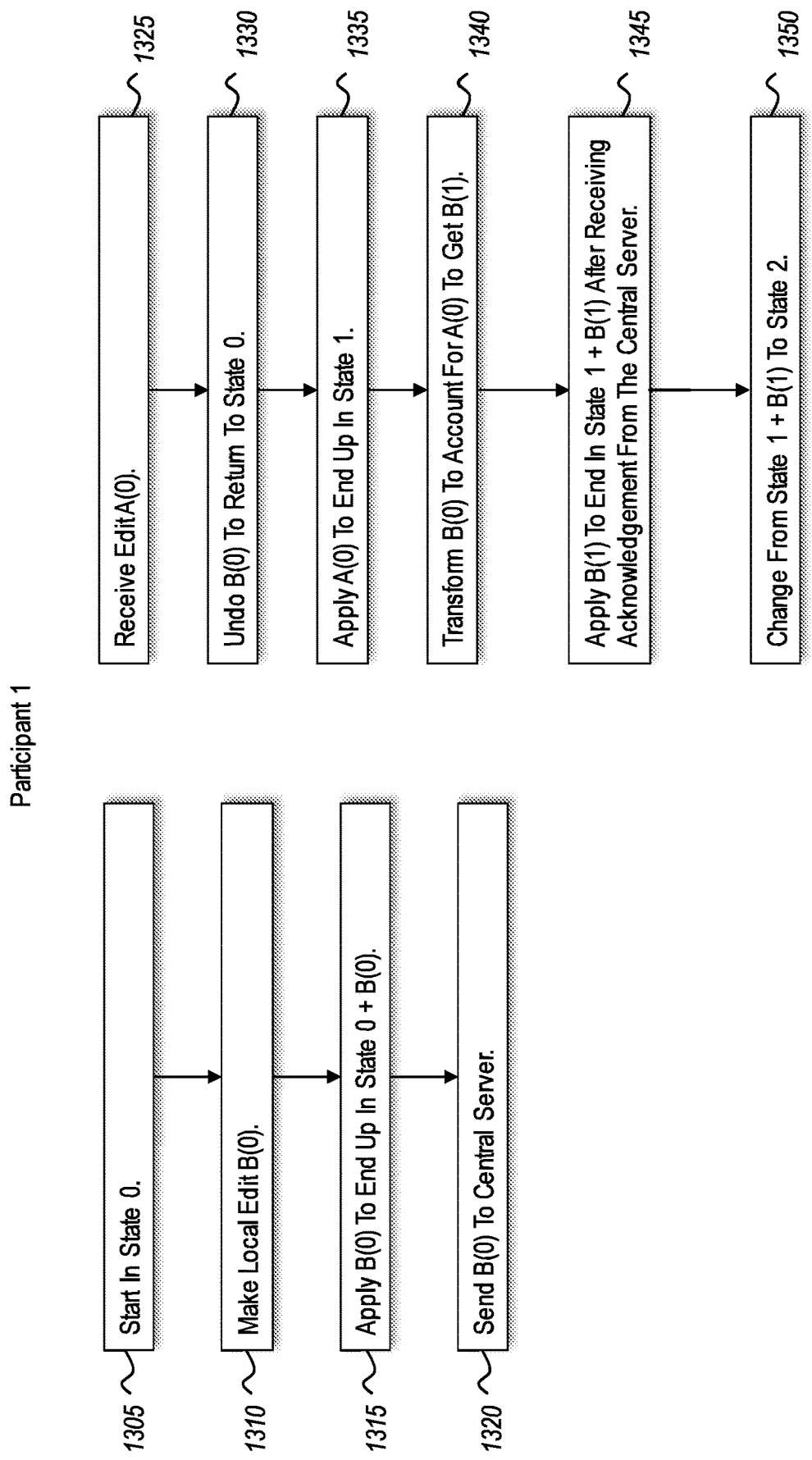
FIGS. 13A and 13B describe an example implementation of tracking edits made to a file using one or more replay-based operational transforms.
Figure 13B:
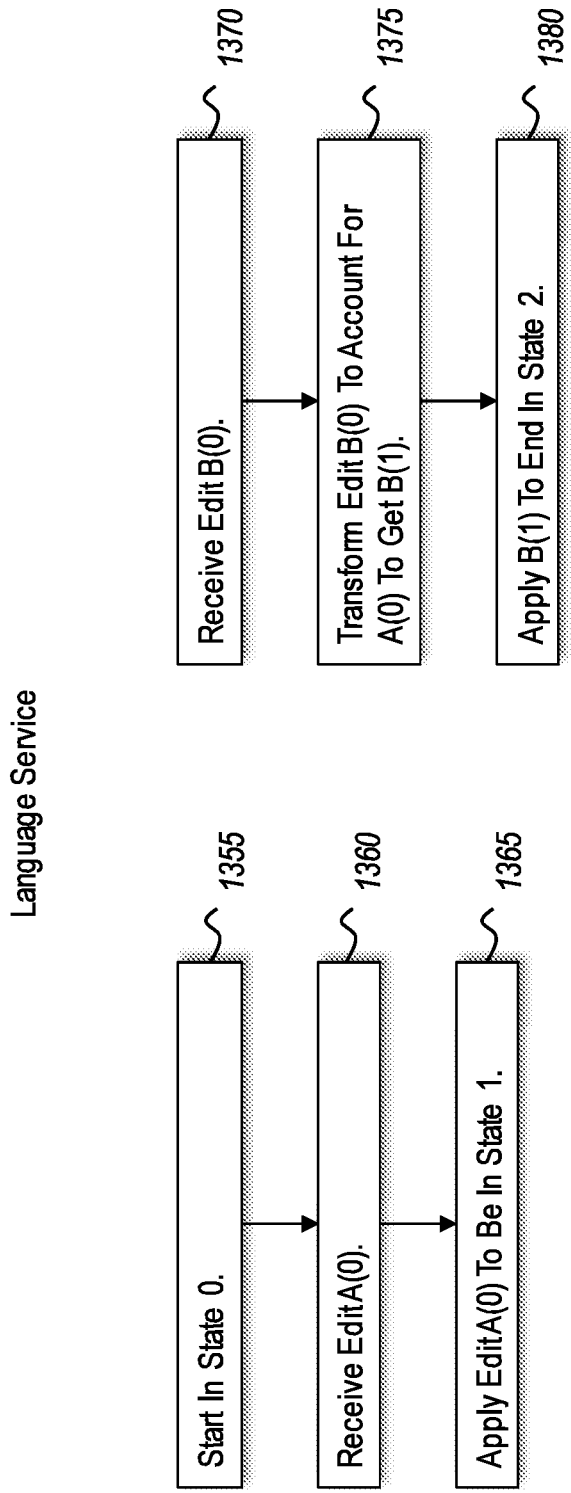

Turning now to FIGS. 13A and 13B, these figures provide an example implementation of how to track edits made to a file using replay-based operational transforms. It will be appreciated that the processes outlined in FIGS. 13A and 13B are for example purposes only and should not be considered as binding. For reference, the processes outlined in FIGS. 13A and 13B may be performed within the architecture and collaboration session shown in FIG. 12. As an additional reference, some of the processes of FIGS. 13A and 13B are shown side by side to each other (i.e. they are shown as occurring in parallel). This parallel arrangement demonstrates that at least some of these processes may be performed without a temporal dependency on some of the other processes.

With that said, FIGS. 13A and 13B show two entities who are interested in tracking the edits made to a file and how that file changes in response to edits. Here, the first entity is a participant computer system (i.e. Participant 1), and the second entity is a language service that is running on an owner computer system. As an example, the language service may be the language service 1230 shown in FIG. 12. For reference, the columns of actions shown for Participant 1 corresponds to Participant 1's operation buffer (i.e. its understanding) while the column of actions shown for the language service corresponds to the language service's operation buffer (i.e. its understanding).

In FIGS. 13A and 13B, both Participant 1 and the language service perform different operations in response to certain information that is received (i.e. messages). These messages are example implementations of the publications that were discussed in relation to FIG. 12. For instance, the "messages" in FIGS. 13A and 13B may be example implementations of the publications 1245A and 1245B from FIG. 12. These messages are used to update each entity's corresponding operation buffer.

Initially, Participant 1 is shown as operating with an understanding that a file, which is stored on an owner computer system, is currently at version/state 0 (act 1305). While at state 0, a local edit ("B(0)"), which is made on Participant 1's computer and which will be propagated to the owner computer system, is made to that file (act 1310). Letters "A" and "B" indicate that an edit will be (or already has been or is currently being) performed on a file stored on the owner computer system. The numbers in parenthesis (i.e. (0) and (1)) indicate file versions that may be assigned to those edits. As such, message B(0) corresponds to a first edit having a file version of "0" (i.e. the edit is to be executed against the file when the file is at version 0) while message B(1) corresponds to a second edit that has a file version of "1" (i.e. the edit is to be executed against the file when the file is at version 1).

In some instances, messages will be received "in-order" (in contrast to being "out-of-order" with respect to one another) when a first received message is to be properly executed against a file before a second received message. Here, it is worthwhile to note that Participant 1 (and also the language service) is not actually editing the file on the owner computer system, instead, the owner computer system will actually edit the file in response to request submitted by the participants. Accordingly, when an entity (e.g., the participant computer system and the language service) tracks edits that are to be executed against a file, that entity is placing file version publications into its operation buffer to thereby update its own understanding of the edits that are being made to the file.

Thereafter, Participant 1 applies edit B(0) to its operational buffer to end up in state 0 (because the actual file has not yet been updated) plus the B(0) edit (act 1315). To properly update the central server and to update the version number of the file, Participant 1 then sends B(0) to the central server (act 1320) (e.g., via the message 1210 in FIG. 12).

At some time, Participant 1 also receives a new edit A(0) (act 1325). Notably, edit A(0) should have occurred before edit B(0). As a result, the edits have been received out-of-order. In response, Participant 1 performs one or more replay-based operational transforms. For instance, Participant 1 undoes B(0) to return to state 0 (act 1330). Then, Participant 1 applies A(0) to end up in state 1 (act 1335).

Participant 1 will then transform B(0) to account for A(0) (act 1340). This transform produces B(1). Now that edit B(1) is properly ordered in relation to edit A(0), Participant 1 will apply B(1) to end up in state 1 plus B(1) after receiving acknowledgement from the central server (act 1345). Then, Participant 1 will change its understanding of the file's version number from state 1 plus B(1) to state 2 (act 1350). In this manner, Participant 1 is able to monitor the edits that are executed against the file. Further, Participant 1 (and the language service) is able to perform replay-based operational transforms by pulling edits from its operational buffer, applying other edits, transforming the pulled edits, and then replacing (i.e. replaying) those edits into its operational buffer.

Turning now to the language service's side in FIG. 13B, here the language service also initially starts at state 0 (act 1355). Next, the language service receives edit A(0) informing the language service that an edit has occurred to the file (act 1360). In response, the language service places that edit in its operational buffer to thereby apply edit A(0) so that the language service understands that the file is now at state 1 (act 1365).

At some other time, the language service receives edit B(0) (act 1370). B(0) is to occur after A(0), but B(0), as indicated by the (0), was originally intended to be performed on file version 0. As such, the language service performs a replay-based operational transform to transform edit B(0) so that it is applied on the most up-to-date version of the file. In this regard, the language service transforms edit B(0) to account for A(0) to thereby produce B(1) (act 1375). Subsequently, the language service applies B(1) to end in state 2 (act 1380). From this example, it is clear that both Participant 1 and the language service are able to monitor the edits that are performed on a file. Further, both of these entities are able to perform replay-based operational transforms.

In some instances, an edit may be considered to be an "unacknowledged" message (for clarity, a "message" corresponds to an "edit" in that the message provides an indication that an edit will be executed against the file). For instance, the local edit B(0) in act 1310 of FIG. 13A is an unacknowledged edit because it has not yet been sent to the central server. As such, some implementations are able to receive one or more "unacknowledged" messages and one or more "acknowledged" messages. To further clarify, when a message is said to be acknowledged, then that message has been assigned a corresponding file version. In contrast, when a message is said to be unacknowledged, then that message has not yet been assigned a corresponding file version.

Accordingly, when edits are received out-of-order (e.g., perhaps because of latency), the embodiments pull (aka "backout") edits from the language service's and/or the participant's operation buffer (e.g., as shown by the undo operation 1330 in FIG. 13A). By pulling edits out of an operation buffer, edits will not be considered as a part of the entity's understanding of the edits that are occurring to the file. Accordingly, the embodiments may refrain from considering/applying the one or more unacknowledged messages while still considering/applying the one or more acknowledged messages to the language service's operation buffer.

In this regard, the language service is able to apply the edits in such a manner so that the end result is consistent with both the actual state of the file as well as Participant 1's understanding. In other words, both Participant 1 and the language service eventually obtain an accurate representation of what the edits that are being executed against the file and how those edits are occurring. This process of reaching the same end result between multiple entities is referred to as achieving "eventual consistency." Accordingly, the language service tracks the edits made to a file by maintaining consistency between the language service's tracking and the edits that are executed against the file.

In some embodiments, a first edit (e.g., perhaps the edit corresponding to edit B(0) in FIG. 13A) may be initiated by a first collaborator (e.g., a participant computer system) at a first time while a second edit (e.g., perhaps the edit corresponding to message A(0) in FIG. 13A) may be initiated by a different collaborator (e.g., the owner computer system) at a second time that is later than the first time. In some circumstances, the first edit and the second edit are received out-of-order with respect to one another. This may occur as a result of network latency. In any event, when the first edit is received after the second edit is received, then the language service is still able to track the edits against the file by performing replay-based operational transforms on the first edit and/or the second edit.

As used herein, the above process is referred to as a process of performing replay-based operational transforms because the entities are able to pull (i.e. backout) certain messages/edits from their operation buffers and apply those messages/edits at a later time. To clarify, after being pulled out of the buffer and after being transformed, those messages/edits are later placed back into the buffer and thus are "replayed."

By performing these processes, the language service is able to participate in monitoring edits made to a file by performing replay-based operational transforms within a collaboration session. Additionally, the participant computer systems are able to perform replay-based operational transforms within the collaboration session. In the end, the entities that are interested in tracking the edits made against a file (e.g., the language service and the participant computer systems) are able to cause their understandings of the file to become consistent with one another, as shown in FIGS. 13A and 13B.

Responding to Language Service Requests

While the language service is participating in monitoring the edits that are occurring to a file using replay-based operational transforms, the language service may also be analyzing the multi-file workspace and building/updating a structural model of that multi-file workspace. Here, the structural model identifies the relationship between the files in the multi-file workspace, including their dependencies. Furthermore, the structural model may identify the relationships between the functions, methods, variables, and other features within the files. Notably, this structural model may be updated based on the language service's tracking of the edits against the file. As described below, the language service is able to respond to language service requests using the knowledge learned from tracking the edits as well as the knowledge included within the structural model of the multi-file workspace.

Now that an understanding has been established regarding how the language service tracks edits made to a file, attention will be directed to how the language service uses its knowledge to respond to language service requests. Therefore, the disclosure will now focus on FIGS. 14 and 15 to demonstrate the various methods regarding how the language service may elect to handle a language service request.

By performing replay-based operational transforms to track edits made to a file, the language service is able to detect when the language service is missing one or more file versions, which suggests that those file versions are still in the process of being communicated. Using that information, the language service is able to determine whether it is currently operating in a consistent state with the file's actual state and can then determine how to handle a language service request, even when messages are missing.

Figure 14:
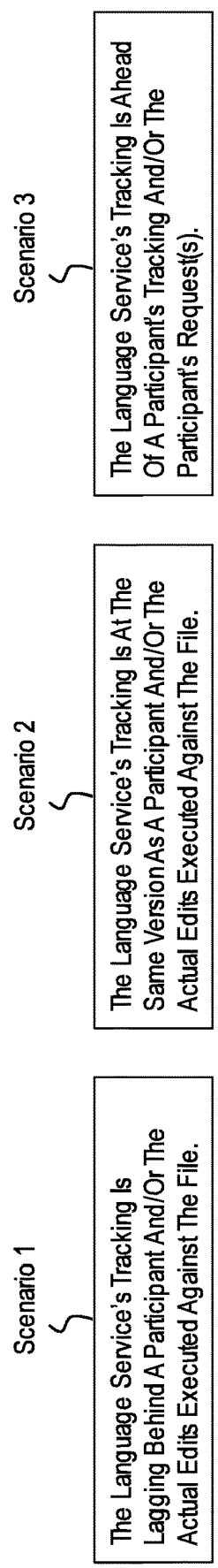
FIG. 14 shows that different scenarios may occur as a result of the language service being an entity that tracks edits made to a file.

FIG. 14 shows three different scenarios. In the first scenario, the language service's tracking is lagging behind a participant's tracking and/or behind the actual edits that are made to the file. In the second scenario, the language service's tracking is at the same version as the participant's tracking and/or the actual edits made to the file. Finally, in the third scenario, the language service's tracking is ahead of the participant's tracking.

Turning first to scenario 1, consider a situation where a participant computer system submits a language service request. For example, suppose a human participant who is using the participant computer system types "ABC" and then a period. "ABC" may be a function and by typing the period, a language service request may be generated for the "ABC" function.

In this situation, the language service's understanding may be lagging behind the participant's understanding. For instance, as indicated earlier, edits may be routed through a central server component where they will be assigned a file version before being received at an entity. As an example, version "1" may be assigned to edit "A," version "2" may be assigned to edit "B," and version 3 may be assigned to edit "C." After assigning each file version, the central server then publishes that information to the language service.

Notably, however, the language service request that was generated upon typing the period may have been delivered straight to the language service without passing through the central server. In this example situation, although three edits (e.g., edits "A," "B," and "C") were made (and which will eventually bring the language service's understanding of the file to a later version), the request may have been generated when the language service was still operating at an earlier file version (e.g., perhaps file version 0) because the language service may not yet be aware of the "ABC" edits. For instance, those edits may still be in the process of being communicated and/or may still be receiving their file versions when the language service received the language service request. As a result, the language service may not understand that the request was for the function "ABC." In this manner, the language service may be lagging behind the entity that initiated the request.

Therefore, in this situation, it is desirable for the language service to recognize that although the request was made on an earlier file version (e.g., file version 0), only one entity (in this example situation) has been modifying the file. As such, the language service is able to understand that the actual edits are likely still being communicated, and the language service can delay responding to the request until the language service receives the publications regarding those new edits (i.e. "ABC"). Once the language service receives the publications from the central server, then the language service can update its understanding and then properly execute the language service request and provide a response to the entity who submitted the request. Therefore, although the request was for an earlier file version, the language service still considers the request to be valid and will still respond to the request appropriately.

The above scenario focused on a situation in which the language service received a set of publications in-order (i.e. edit "A" then edit "B" then edit "C"). In some situations, however, an out-of-order "interfering" message (e.g., a message corresponding to an edit made by a different collaborator) may be injected into the stream of publications and thus interfere with the ordering of the A, B, and C edits. While the language service can handle this out-of-order message using replay-based operational transforms (e.g., by backing messages out of its operation buffer), it may be beneficial to cause the language service to perform one or more alternative actions. For instance, the language service may elect to further delay processing the original language service request until its operation buffer has caught up to accurately reflect the edits that have been made to the file (i.e. the file's current state). Alternatively, the language service may elect to cancel the request entirely and submit a response informing the participant computer system that it should resubmit the language service request again at a later time.

Here, an example will be helpful. Consider a scenario where there are multiple collaborators editing a single file. In addition to edits being made against a file, a language service request (e.g., a completion request) may also be generated. This completion request is transmitted directly to the language service for processing. In this scenario, the completion request may indicate that completion is requested at a particular location within the source code (e.g., at line 10 column 12). Here, the language service knows about the context of the source code and, based on this context, understands what is meant by a completion request at line 10 column 12. Of note, however, line 10 column 12 could be different for each of the participants as well as the language service because some of the edits and/or messages may still be in the process of being communicated.

For scenario 1 in which the language service is lagging (i.e. its operation buffer has not yet caught up to the current file version), the language service can analyze the current language service request and determine the file version associated with that request. In this situation, the language service will be able to understand that the participant who made the language service request is operating at a file version that is ahead of the language service's lagging file version. As such, the language service can elect to simply wait to catch up to the same file version as the participant.

In this manner, the language service may delay processing the request until its understanding is up to date. Here, the language service need not send a failure notice because the language service will eventually return a response. Accordingly, in situations where the language service is lagging, the language service may simply delay processing language service requests until its operation buffer catches up to the file version indicated by the request.

Turning now to scenario 2, this scenario relates to a situation in which the language service's tracking is at the same file version as a participant's tracking and/or the actual state of the file. When presented with such a situation, then the language service can immediately respond to a language service request using its up-to-date tracking of the edits made to the file. As such, the language service need not delay or issue any failure notices.

Turning now to scenario 3, this scenario relates to a situation in which the language service's tracking is ahead of a participant's tracking (i.e. the participant is now lagging). As an example, the language service may be operating at file version 3 whereas one of the participant computer systems may be operating at file version 0, 1, or 2. In this case, the participant computer system is lagging behind the language service.

When faced with such a situation, the language service can respond to language service requests in various different ways. In one option, the language service can simply cancel a request that is received from a lagging participant computer system. In most situations, this is a beneficial option because the participant computer system will eventually catch up to the proper file version. At that time, the language service request may then be automatically resubmitted (e.g., in a code highlighting or colorization scenario, the highlighting request may occur automatically once the participant computer system catches up to the correct file version). Thereafter, the language service may respond to the resubmitted request. The fact that the earlier request was cancelled did not negatively impact the participant computer system because another request was automatically resubmitted later once the participant computer system caught up to the proper file version.

In another option, the language service can rollback its operation buffer (e.g., by pulling messages out from the operation buffer) until the operation buffer reaches the same version indicated by the language service request. After performing this rollback, the language service can then compute a response and provide that response to the requesting entity. After providing the response, the language service may then undo the rollback (e.g., by placing those messages back into the operation buffer) and return to the most up-to-date file version. Selecting the option to rollback may be based on what type of language service request was received, as described below.

For some requests (e.g., code completion), it may be desirable to rollback so that the request can be properly handled. For other requests (e.g., code highlighting, code colorization, quick control, tool tip, some hover features, a code navigation request, or a "go to" request), it may be desirable to simply cancel the request because the language service understands that when the requesting entity catches up, then another language service request will be automatically resubmitted and that new request can be properly handled at that time. For some other requests, it is possible to translate a request's location within the operation buffer without having to perform a rollback operation or a cancel operation. For instance, if the current state of the buffer indicates that the language service is currently not performing edits, then certain requests may be translated from one location to another without impairing the operational buffer. Accordingly, as indicated above, another option is to allow the language service to simply fail to process the language service request and perhaps provide a response informing the requesting entity that it should resubmit a request.

As such, the language service is able to determine how to handle a language service request based, at least in part, on the request's determined type. As another example, for language service requests that impact the file's state (e.g., a code completion request impacts state because new code may be entered into the source code), the language service may elect to handle the request in one manner (e.g., delay, rollback, or respond immediately). For language service requests that do not impact the file's state (e.g., code highlighting or colorization), the language service may elect to handle the request in a different manner (e.g., cancel the request if the request is based on a lagged file version).

Figure 15:
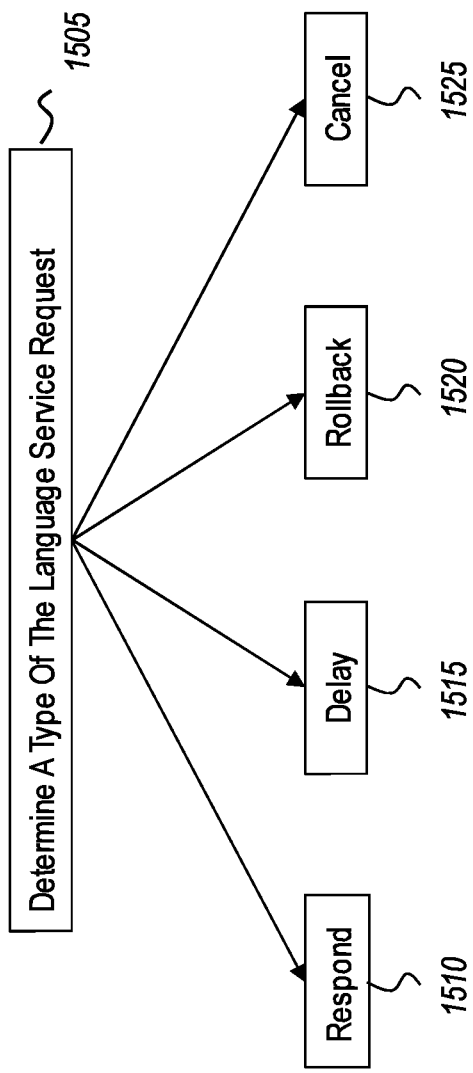
FIG. 15 shows some of the various different response methods that a language service may elect to follow when responding to a language service request.

These various different response options are illustrated in FIG. 15. Here, the language service is able to determine a type of the language service request at act 1505. Then, based on this determined type, the language service may respond in a variety of ways. The ways include immediately responding 1510, delay responding 1515, rolling back 1520 to an earlier file version in order to respond, or canceling 1525 the request.

Accordingly, significant advantages are realized by following the principles disclosed herein. In particular, by enabling the language service to participate in tracking a file's state (e.g., by using the same logic as the other participant computer systems, namely, replay-based operational transforms), the language service is able to maintain consistency with the file and with the other participant computer systems. In this manner, the language service is able to determine how best to respond to a language service request, even when a file corresponding to the request changes.

In some instances, the language service determines that some requests are invalid and can be ignored or cancelled. In other instances, the language service is able to eventually provide a response (perhaps immediately or after a delay). In any event, consistency is eventually achieved between the language service and the participant computer systems. In this manner, significant benefits are achieved because the language service can not only respond to language service requests, but it can also deal with the concept of failing to execute a request.

Although the above scenarios focused on a situation in which the language service was configured to perform these operations, other configurations are also available. For instance, an intermediary component may operate in tandem with the language service. Therefore, instead of reconfiguring a language service, the intermediary component can simply be plugged into the architecture. This intermediary component may include the intelligence on deciding which language service requests will actually be executed by the language service. To clarify, the intermediary component can decide which language service requests will be executed by passing those requests to the language service. Additionally, if the intermediary component determines that a request should be delayed, then the intermediary component may hold on to the request until a later time.

Furthermore, if the intermediary component determines that a request should fail, then the intermediary component can elect to never pass that request on to the language service. In this manner, the language service may continue to operate according to its normal configuration and protocols, and the intermediary component may include all of the intelligence in determining how to handle language service requests. Even further, the intermediary component may track the file's changing state by performing the replay-based operational transforms. Therefore, although the above discussion focused on scenarios in which the language service performed these operations, a "façade" intermediary component may actually be configured to perform the operations.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An owner computer system comprising:
one or more processors; and
one or more computer-readable hardware storage devices having stored thereon computer-executable instructions that are structured to be executable by the one or more processors to thereby cause the owner computer system to:
within a collaboration session in which the owner computer system and a participant computer system are both members, receive a plurality of messages directed toward a file stored on the owner computer system, the plurality of messages including
(1) multiple edits that are to be executed against the file and
(2) one or more language service requests that are also to be executed against the file;
for each of at least a subset of the multiple edits that are to be executed against the file, assign a file version to each of the edits in the subset of edits, wherein assigning the file versions defines an ordering for the edits in the subset of edits, and wherein, as each of the edits in the subset of edits is executed against the file in accordance with the ordering, a state of the file correspondingly changes;
publish the file versions to the participant computer system and to a language service running on the owner computer system; and
cause the language service to
(1) use the published file versions to track each of the edits in the subset of edits that are being executed against the file and monitor how the file changes in response to each of the edits in the subset of edits, wherein tracking and monitoring comprises maintaining an operation buffer which provides the language service with an understanding of a current state of the file, and
(2) respond to the one or more language service requests using the language service's tracking of each of the edits in the subset of edits, such that the one or more language service requests are applied to the understanding of the current state of the file provided by the operation buffer.

2. The owner computer system of claim 1, wherein the language service tracks each of the edits in the subset of edits by performing one or more replay-based operational transforms.

3. The owner computer system of claim 2, wherein, after determining that the language service is missing one or more file versions, the language service then determines how to handle the one or more language service requests given that there are one or more missing file versions.

4. The owner computer system of claim 2, wherein at least one of the one or more language service requests originates from the participant computer system such that the language service responds to the participant computer system's at least one language service request.

5. The owner computer system of claim 2, wherein a first language service request included in the one or more language service requests includes a completion request.

6. The owner computer system of claim 2, wherein the language service responds to the one or more language service requests by (1) executing at least one of the one or more language service requests based on the one or more replay-based operational transforms, (2) delaying execution of at least one of the one or more language service requests, (3) canceling at least one of the one or more language service requests, and/or (4) rolling back to an earlier file version to execute at least one of the one or more language service requests.

7. The owner computer system of claim 2, wherein the language service responds to the one or more language service requests based, at least in part, on a determined type of the one or more language service requests.

8. The owner computer system of claim 7, wherein language service requests that impact the file's state are handled differently than language service requests that do not impact the file's state.

9. The owner computer system of claim 1, wherein the file is one of a plurality of files included within a multi-file workspace, and wherein the language service:
analyzes the multi-file workspace;

builds a structural model of the multi-file workspace, wherein the structural model is updated based on the language service's tracking of each of the edits in the subset of edits; and responds to the one or more language service requests using both the language service's tracking of each of the edits in the subset of edits and the structural model of the multi-file workspace.

10. The owner computer system of claim 1, wherein a previous edit of the multiple edits is initiated from the participant computer system at a first time, wherein a subsequent edit of the multiple edits is initiated from the owner computer system at a second time that is later than the first time, wherein, as a result of network latency, the previous edit is received by the owner computer system after the subsequent edit is received by the owner computing system, and wherein the language service tracks the previous edit and/or the subsequent edit by performing replay-based operational transforms on the previous edit and/or the subsequent edit.

11. A method for tracking a file's changing state to ensure that edits made on the file are monitored consistently across multiple monitoring entities and for responding to language service requests using the tracking, the method being performed by an owner computer system that includes one or more processors, the method comprising:

within a collaboration session in which the owner computer system and a participant computer system are both members, receiving a plurality of messages directed toward a file stored on the owner computer system, the plurality of messages including
(1) multiple edits that are to be executed against the file and
(2) one or more language service requests that are also to be executed against the file;

for each of at least a subset of the multiple edits that are to be executed against the file, assigning a file version to each of the edits in the subset of edits, wherein assigning the file versions defines an ordering for the edits in the subset of edits, and wherein, as each of the edits in the subset of edits is executed against the file in accordance with the ordering, a state of the file correspondingly changes;

publishing the file versions to the participant computer system and to a language service running on the owner computer system; and causing the language service to
(1) use the published file versions to track each of the edits in the subset of edits that are being executed against the file and monitor how the file changes in response to each of the edits in the subset of edits, wherein tracking and monitoring comprises maintaining an operation buffer which provides the language service with an understanding of a current state of the file, and
(2) respond to the one or more language service requests using the language service's tracking of each of the edits in the subset of edits, such that the one or more language service requests are applied to the understanding of the current state of the file provided by the operation buffer.

12. The method of claim 11, wherein the language service tracks each of the edits in the subset of edits by performing one or more replay-based operational transforms.

13. The method of claim 12, wherein performing the one or more replay-based operational transforms includes:

receiving one or more unacknowledged messages and one or more acknowledged messages, wherein a message is acknowledged when the message has been assigned a corresponding file version, and wherein a message is unacknowledged when the message has not yet been assigned a corresponding file version;

refraining from applying the one or more unacknowledged messages while applying the one or more acknowledged messages; and transforming the one or more unacknowledged messages and then replaying and applying those transformed messages.

14. The method of claim 11, wherein at least one of the one or more language service requests originates from the participant computer system such that the language service responds to the participant computer system's at least one language service request.

15. The method of claim 11, wherein a first language service request included in the one or more language service requests includes a completion request.

16. The method of claim 11, wherein the language service tracks each of the edits in the subset of edits at least prior to performing a particular action, ensuring that a latest file version known by the language service is a most current file version of the file.

17. The method of claim 11, wherein a previous edit of the multiple edits is initiated from the participant computer system at a first time, wherein a subsequent edit of the multiple edits is initiated from the owner computer system at a second time that is later than the first time.

18. The method of claim 11, wherein the defined ordering is an execution order in which the edits are to be executed against the file.

19. The method of claim 11, wherein the file is one of a plurality of files included within a multi-file workspace, and wherein the language service:

analyzes the multi-file workspace;

builds a structural model of the multi-file workspace, wherein the structural model is updated based on the language service's tracking of each of the edits in the subset of edits; and responds to the one or more language service requests using both the language service's tracking of each of the edits in the subset of edits and the structural model of the multi-file workspace.

20. One or more hardware storage components having stored thereon computer-executable instructions that are structured to be executable by one or more processors of an owner computer system to thereby cause the owner computer system to:

within a collaboration session in which the owner computer system and a participant computer system are both members, receive a plurality of messages directed toward a file stored on the owner computer system, the plurality of messages including
(1) multiple edits that are to be executed against the file and
(2) one or more language service requests that are also to be executed against the file;

for each of at least a subset of the multiple edits that are to be executed against the file, assign a file version to each of the edits in the subset of edits, wherein assigning the file versions defines an ordering for the edits in the subset of edits, and wherein, as each of the edits in the subset of edits is executed against the file in accordance with the ordering, a state of the file correspondingly changes;

publish the file versions to the participant computer system and to a language service running on the owner computer system; and cause the language service to
(1) use the published file versions to track each of the edits in the subset of edits that are being executed against the file and monitor how the file changes in response to each of the edits in the subset of edits, wherein tracking and monitoring comprises maintaining an operation buffer which provides the language service with an understanding of a current state of the file, and
(2) respond to the one or more language service requests using the language service's tracking of each of the edits in the subset of edits, such that the one or more language service requests are applied to the understanding of the current state of the file provided by the operation buffer.

* * * * *